United States Patent
Takano

(10) Patent No.: US 9,986,552 B2
(45) Date of Patent: May 29, 2018

(54) RADIO COMMUNICATION DEVICE, RADIO COMMUNICATION METHOD, AND RADIO COMMUNICATION SYSTEM HAVING REDUCED INTERFERENCE

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 80 days.

(21) Appl. No.: 14/346,412

(22) PCT Filed: Aug. 24, 2012

(86) PCT No.: PCT/JP2012/071471
§ 371 (c)(1),
(2), (4) Date: May 28, 2014

(87) PCT Pub. No.: WO2013/051350
PCT Pub. Date: Apr. 11, 2013

(65) Prior Publication Data
US 2014/0307685 A1    Oct. 16, 2014

(30) Foreign Application Priority Data

Oct. 7, 2011    (JP) .................... 2011-223052

(51) Int. Cl.
*H04W 72/04*    (2009.01)
*H04W 72/08*    (2009.01)
(Continued)

(52) U.S. Cl.
CPC ....... *H04W 72/0426* (2013.01); *H04W 24/02* (2013.01); *H04W 72/042* (2013.01);
(Continued)

(58) Field of Classification Search
CPC ........... H04W 72/042; H04W 72/0426; H04W 72/0453; H04W 72/082; H04W 24/02; H04W 16/14; H04W 84/045
See application file for complete search history.

(56) References Cited

U.S. PATENT DOCUMENTS 8,452,240 B2    5/2013    Takahashi
8,533,370 B2    9/2013    Tanaka et al.
(Continued)

FOREIGN PATENT DOCUMENTS

| CN | 102090109 A | 6/2011 |
|----|-------------|--------|
| JP | 2011-077964 A | 4/2011 |
| WO | WO 2009/118378 A1 | 10/2009 |

OTHER PUBLICATIONS

No Author Listed, Huawei, HiSilicon, Additional carrier types—motivations and issues, 3GPP TSG RAN WG1 Meeting #66, R1-112463, Athens, Greece, Aug. 22-26, 2011, pp. 1-5.
(Continued)

*Primary Examiner* — Joshua Kading
(74) *Attorney, Agent, or Firm* — Wolf, Greenfield & Sacks, P.C.

(57) ABSTRACT

A radio communication device includes an information acquisition unit to acquire information of a frequency position at which predetermined indispensable information is allocated in a data area of a downlink subframe transmitted by an adjacent base station, and a transmission control unit to transmit a narrow band carrier in a data area of a downlink subframe of a current cell in a manner that the narrow band carrier does not overlap with the frequency position at which the predetermined indispensable information is allocated, the narrow band carrier having a narrower band than a donor band.

13 Claims, 23 Drawing Sheets

(51) Int. Cl.
*H04W 24/02* (2009.01)
*H04W 84/04* (2009.01)
*H04W 16/14* (2009.01)

(52) U.S. Cl.
CPC ..... *H04W 72/0453* (2013.01); *H04W 72/082* (2013.01); *H04W 84/045* (2013.01); *H04W 16/14* (2013.01)

(56) References Cited

U.S. PATENT DOCUMENTS

| | | | |
|---|---|---|---|
| 8,995,942 | B2 | 3/2015 | Watanabe |
| 9,480,053 | B2 | 10/2016 | Takano et al. |
| 9,516,639 | B2 | 12/2016 | Takano |
| 9,544,780 | B2 | 1/2017 | Takano |
| 9,621,328 | B2 | 4/2017 | Takano et al. |
| 2007/0104140 | A1 | 5/2007 | Ashish et al. |
| 2007/0218948 | A1 | 9/2007 | Kurokawa |
| 2010/0008317 | A1 | 1/2010 | Bhattad et al. |
| 2010/0034163 | A1* | 2/2010 | Damnjanovic ....... H04L 1/1893 370/329 |
| 2010/0120415 | A1 | 5/2010 | Urquhart et al. |
| 2010/0260081 | A1* | 10/2010 | Damnjanovic ....... H04L 5/0053 370/281 |
| 2010/0279689 | A1 | 11/2010 | Tinnakornsrisuphap et al. |
| 2010/0329384 | A1* | 12/2010 | Kwak ................... H04L 5/0007 375/295 |
| 2011/0076965 | A1 | 3/2011 | Takahashi |
| 2011/0081870 | A1 | 4/2011 | Watanabe |
| 2011/0106984 | A1 | 5/2011 | Tanaka et al. |
| 2011/0170496 | A1* | 7/2011 | Fong ................... H04L 5/0053 370/329 |
| 2012/0003981 | A1* | 1/2012 | Krishnamurthy ..... H04W 24/10 455/450 |
| 2012/0115485 | A1* | 5/2012 | Narasimha ........... H04W 68/02 455/437 |
| 2012/0263093 | A1* | 10/2012 | Roessel ................. H04L 5/0053 370/312 |
| 2012/0327894 | A1* | 12/2012 | Axmon ................. H04W 48/12 370/330 |
| 2012/0327895 | A1* | 12/2012 | Wallen ................. H04W 48/12 370/330 |
| 2014/0192759 | A1* | 7/2014 | Son ..................... H04W 72/042 370/329 |
| 2015/0110083 | A1 | 4/2015 | Takano |
| 2015/0117348 | A1 | 4/2015 | Takano et al. |
| 2015/0119064 | A1 | 4/2015 | Takano |
| 2015/0139108 | A1 | 5/2015 | Takano |
| 2015/0156006 | A1 | 6/2015 | Takano et al. |
| 2015/0195064 | A1 | 7/2015 | Takano |
| 2016/0080135 | A1 | 3/2016 | Takano et al. |
| 2016/0135157 | A1* | 5/2016 | Takano ................. H04W 16/06 370/330 |
| 2017/0041937 | A1 | 2/2017 | Takano |
| 2017/0079023 | A1 | 3/2017 | Takano et al. |

OTHER PUBLICATIONS

No Author Listed, New Postcom, Detection of PCI, MIB, SIBs, and paging in dorminat interference HetNet, 3GPP TSG RAN WG1 Meeting #65, R1-111440, Barcelona, Spain, May 9-13, 2011, pp. 1-3.

No Author Listed, New Postcom, Discussions on certain open issues in ICIC, 3GPP TSG RAN WG1 Meeting #66, R1-112147, Athens, Greece, Aug. 22-26, 2011, pp. 1-5.

* cited by examiner

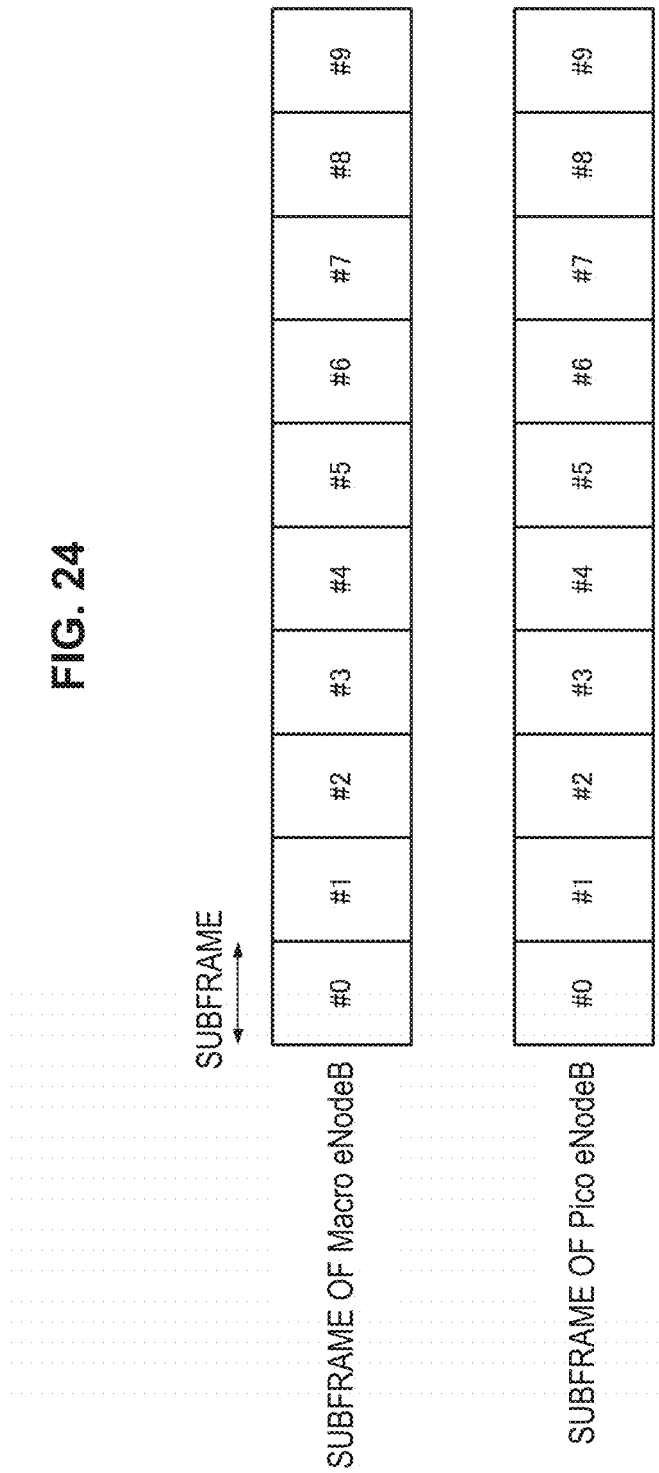

RADIO COMMUNICATION DEVICE, RADIO COMMUNICATION METHOD, AND RADIO COMMUNICATION SYSTEM HAVING REDUCED INTERFERENCE

THE CROSS REFERENCES TO RELATED APPLICATIONS

The present application is the National Stage of International Application No. PCT/JP2012/071471, filed in the Japanese Patent Office as a Receiving Office on Aug. 24, 2012, which claims the priority benefit of Japanese Patent Application Number 2011-223052, filed in the Japanese Patent Office on Oct. 7, 2011, which is hereby incorporated by reference in its entirety.

TECHNICAL FIELD

The technology disclosed in the present description relates to a radio communication device which serves as a base station, a radio communication method, and a radio communication system in a radio communications environment in which cells with different sizes are hierarchically structured, and particularly to a radio communication device which reduces interference between the cells, a radio communication method, and a radio communication system in a radio communications environment in which the cells with different sizes are hierarchically structured.

BACKGROUND ART

At present, 3GPP (Third Generation Partnership Project) is working on standardization of the 4th generation mobile communication system. "LTE (Long Term Evolution)", which is one of the data communication specifications defined by the 3GPP, is a long term advancement system aiming for 4th generation (4G) IMT-Advanced, and is also referred to as "3.9G (super 3G)".

In the LTE, 2 types of duplex methods, FDD (Frequency Division Duplex) and TDD (Time Division Duplex) are available for selection. In the FDD, a band dedicated for uplink and a band dedicated for downlink are used. For each of the uplink and the downlink, a radio frame format including 10 contiguous subframes is used. The uplink herein refers to communication from a terminal station (UE terminal: User Equipment) to a base station of LTE (eNodeB: evolved Node B), and the downlink refers to communication from an eNodeB to a UE terminal. In the TDD, a radio frame format including 10 contiguous subframes is used, too. However, in the TDD, the same band is used for communication in the uplink and the downlink. Each subframe in a radio frame includes a control signal PDCCH (Phy Downlink Control Channel) from an eNodeB, and a PDSCH (Phy Downlink Shared Channel) which is used as user data.

In the LTE, 1-cell reuse is applied, that is, one frequency is used by all the cells in common. This is because using different frequencies between adjacent base stations as in a conventional cellular causes a shortage of frequency resources. In this case, a problem arises in that radio waves transmitted and received via UE terminals around a cell cause interference. Thus, the LTE, which is the 3GPP Rel 8, uses a technology called inter cell interference coordination (ICIC) in the Rel 8.

The ICIC can be achieved, for example, by fractional frequency reuse which is a combination of 1 cell frequency reuse and multiple cell frequency reuse. FIG. 14 illustrates the manner in which three cells 1 to 3, which perform fractional frequency reuse, are adjacent to each other. In FIG. 14, the range of each cell is indicated by a hexagon. In the fractional frequency reuse, each cell is divided into a central area (unshaded area inside the cell) which is inside the cell and near an eNodeB, and a peripheral area (shaded area at the edge of the cell) which is at the edge of the cell and located away from the eNodeB. Although a "center frequency" assigned to the communication between the eNodeB and UE terminals in the central area causes a conflict (that is, 1-cell frequency reuse) between the cell and an adjacent cell, the eNodeB avoids interference between the cells by reducing transmission power so that signals can be transmitted only within the central area. On the other hand, the eNodeB needs to use high power for transmission in order to send signals to the peripheral area, and avoids interference between the cells by using mutually different "peripheral frequencies" (that is, multiple cell frequency reuse) for the peripheral areas of the cell and the adjacent cell. In the illustrated example, a 20 MHz band is divided into, for example, 3 bands, and peripheral frequencies are reused so as not to overlap with each other between adjacent cells. In FIG. 14, differences between frequency bands are indicated by types of shading (diagonal line, vertical shading line, horizontal shading line).

In addition to the above-mentioned frequency reuse technology, in the ICIC of the 3GPP Rel 8, a signal for reducing interference is exchanged between base stations, that is, eNodeBs via the X2 interface. The X2 interface is an interface that connects between eNodeBs, and is typified by a transmission medium such as an optical fiber. Specifically, High Interference Indicator (HII) and Overload Indicator (OI) are each defined as a message to be exchanged via the X2 interface.

The HII is the information for informing an adjacent eNodeB of the location of a resource block which is assigned to a UE terminal at the cell edge. It is probable that the adjacent eNodeB is subject to interference from a resource block specified by the HII. Thus, taking this into consideration, the adjacent cell performs scheduling of the resource block. On the other hand, the OI is the information for informing of the level of interference of an uplink resource block, and has 3 levels Low/Medium/High. When the adjacent eNodeB is informed by the OI via the X2 interface that the level of interference to a certain resource block is High, the adjacent eNodeB adjusts scheduling of the resource block, and/or uplink power control.

In this manner, the ICIC in the 3GPP Rel8 adopts the adjustment method via the X2 interface for the purpose of eliminating interference between macro cells. The method, however, allows only the PDSCH in subframes to be adjusted, and the PDCCH portion cannot be adjusted. This is because the PDCCH has a format which allows the same band to be used between adjacent cells and is resistant to interference.

The ICIC in 3GPP Rel 10 will be described in the following. The ICIC in the Rel 10 aims to reduce interference between a macro cell and a pico cell.

In the 3GPP, a network referred to as HetNet has been studied in which various sized cells such as Macro/Micro/Pico/Femto are hierarchically structured to increase the overall system capacity. For example, a Pico eNodeB, which is the base station of a pico cell, has a characteristic that the transmission output thereof is lower than the transmission output of a Macro eNodeB which is the base station of a macro cell, of the order of tens of dB. It can be assumed that the X2 interface is provided between the Macro eNodeB and the Pico eNodeB (in other words, the interference of the PDSCH portion in subframes has been addressed by the ICIC in the Rel 8). However, in some cases, it is necessary to assume that the X2 interface between the Picoe NodeB and the Macro eNodeB has inferior characteristics of speed, capacity, and delay compared with the X2 interface between Macro eNodeBs.

Because the transmission power from the Pico eNodeB is low, an increasing number of areas will receive signals with higher power from the Macro eNodeB. Even in an area where a loss in transmission from a pico cell is lower than a loss in transmission from the Macro eNodeB (or an area which is closer in distance to the Pico eNodeB than the Macro eNodeB), higher received power from the Macro eNodeB often causes a UE terminal to attempt RRC (Radio Resource)_Connected to the Macro eNodeB in a far distance rather than the Pico eNodeB in the vicinity. However, uplink connection is advantageously made to a base station having a lower transmission loss in consideration of consumption of the battery at the UE terminal, and it is important to obtain a gain through cell division by assigning UE terminals to the pico cell in a heterogeneous environment such as HetNet including combinations of different types of cells. For these reasons, it is necessary to address the problem that each UE terminal tends to be connected to the Macro eNodeB only.

Thus, the Rel 10 defines a technology referred to as Range Expansion. The Range Expansion will be described with reference to FIG. 15. A UE terminal, when performing cell selection, that is, determining a base station to be associated with, selects to be associated with an eNodeB having higher power, based on the received power (RSRP: Reference Signal Received Power) obtained from a reference signal (Cell-specific reference signal) from each eNodeB. When the RSRP is evaluated for each eNodeB, for example, an offset of 10 dB is added to the RSRP of the Pico eNodeB for the evaluation so that the area including UE terminals to be associated with the Pico eNodeB is expanded. This is the Range Expansion and the area of expanded portion is called a Range Expansion Area. The Range Expansion Area is an area in which a UE terminal, which is originally to be associated with the Macro eNodeB due to low RSRP from the Pico eNodeB, can be associated with the Pico eNodeB thanks to an offset of RSRP, that is, the technology of the Range Expansion.

Some UE terminals in the Range Expansion Area may have higher received power from the Macro eNodeB than that from the Pico eNodeB which is associated with. In other words, the Range Expansion Area has a drawback in that the reception from the Pico eNodeB by the UE terminals is susceptible to interference from the Macro eNodeB. In the Range Expansion Area, a problem occurs of downlink interference between the Pico eNodeB and the Macro eNodeB.

For example, a communication system which controls interference to a home base station device has been proposed, the communication system including a mobile station, a base station device that manages macro cells, and the home base station device that manages a femto cell, a pico cell, a nano cell, and a home cell (for example, refer to Patent Literature 1). However, the communication system does not control downlink interference to the UE terminals in the Range Expansion Area.

CITATION LIST

Patent Literature

Patent Literature 1: JP 2011-77964A

SUMMARY OF INVENTION

Technical Problem

It is an object of the technology disclosed in the present description to provide an excellent radio communication device, a radio communication method, and a radio communication system that are capable of preferably reducing interference between cells, in a radio communications environment in which the cells with different sizes are hierarchically structured.

Another object of the technology disclosed in the present description is to provide an excellent radio communication device, a radio communication method, and a radio communication system that are capable of preferably reducing downlink inter-cell interference to a terminal, in a radio communications environment in which cells with different sizes are hierarchically structured, the radio communication device serving as a base station.

Solution to Problem

In the light of the foregoing issues, the present application has been presented and according to the invention described in claim 1, there is provided a radio communication device including an information acquisition unit configured to acquire information of a frequency position at which predetermined indispensable information is allocated in a data area of a downlink subframe transmitted by an adjacent base station, and a virtual carrier transmission control unit configured to transmit a virtual carrier in a data area of a downlink subframe of a current cell in a manner that the virtual carrier does not overlap with the frequency position at which the predetermined indispensable information is allocated, the virtual carrier having a narrower band than a donor band.

According to the technology described in claim 2 of the present application, in the radio communication device according to claim 1, the subframes are synchronized between the radio communication device and the adjacent base station.

According to the technology described in claim 3 of the present application, in the radio communication device according to claim 1, the subframes are not synchronized between the radio communication device and the adjacent base station.

According to the technology described in claim 4 of the present application, there is provided a radio communication device including an information acquisition unit configured to acquire information of a location at which predetermined indispensable information is allocated in a data area of a downlink subframe transmitted by an adjacent base station, and a virtual carrier operation unit configured to prohibit operation of a virtual carrier in a data area of a downlink subframe of a current cell, the downlink subframe overlapping with the subframe in which the predetermined indispensable information is allocated, the virtual carrier having a narrower band than a donor band.

According to the technology described in claim 5 of the present application, in the radio communication device according to claim 4, the subframes are synchronized between the radio communication device and the adjacent base station.

According to the technology described in claim 6 of the present application, in the radio communication device according to claim 4, the subframes are not synchronized between the radio communication device and the adjacent base station.

According to the technology described in claim 7 of the present application, there is provided a radio communication device including an information acquisition unit configured to acquire information of a location at which predetermined indispensable information is allocated in a data area of a downlink subframe transmitted by an adjacent base station, and a virtual carrier operation unit configured to prohibit transmission of control information of a virtual carrier in a data area of a downlink subframe of a current cell, the downlink subframe overlapping with the subframe in which the predetermined indispensable information is allocated, the virtual carrier having a narrower band than a donor band.

According to the technology described in claim 8 of the present application, in the radio communication device according to claim 7, the subframes are synchronized between the radio communication device and the adjacent base station.

According to the technology described in claim 9 of the present application, there is provided a radio communication device including an information acquisition unit configured to acquire information of a frequency band in which a control area of a virtual carrier is allocated in a data area of a downlink subframe by an adjacent base station, the virtual carrier having a narrower band than a donor band, and a subframe transmission control unit configured to transmit control information of a downlink subframe of a current cell without overlapping with the frequency band in which the control area of the virtual carrier is allocated by the adjacent base station.

According to the technology described in claim 10 of the present application, in the radio communication device according to claim 9, the subframes are not synchronized between the radio communication device and the adjacent base station.

According to the technology described in claim 11 of the present application, there is provided a radio communication device including an information acquisition unit configured to acquire information of a band included in a downlink subframe transmitted by an adjacent base station, the information of the band carrying control information for all terminals in the adjacent cell, and a virtual carrier transmission control unit configured to transmit a control area of a virtual carrier in a data area of a downlink subframe of a current cell in a manner that the control area does not overlap with a band for transmitting the control information by the adjacent base station, the virtual carrier having a narrower band than a donor band.

According to the technology described in claim 12 of the present application, in the radio communication device according to claim 11, the subframes are not synchronized between the radio communication device and the adjacent base station.

According to the technology described in claim 13 of the present application, there is provided a radio communication method including a step of acquiring information of a frequency position at which predetermined indispensable information is allocated in a data area of a downlink subframe transmitted by an adjacent base station, and a step of transmitting a virtual carrier in a data area of a downlink subframe of a current cell in a manner that the virtual carrier does not overlap with the frequency position at which the predetermined indispensable information is allocated, the virtual carrier having a narrower band than a donor band.

According to the technology described in claim 14 of the present application, there is provided a radio communication method including a step of acquiring information of a location at which predetermined indispensable information is allocated in a data area of a downlink subframe transmitted by an adjacent base station, and a virtual carrier operation step of prohibiting operation of a virtual carrier in a data area of a downlink subframe of a current cell, the downlink subframe overlapping with the subframe in which the predetermined indispensable information is allocated, the virtual carrier having a narrower band than a donor band.

According to the technology described in claim 15 of the present application, there is provided a radio communication method including a step of acquiring information of a location at which predetermined indispensable information is allocated in a data area of a downlink subframe transmitted by an adjacent base station, and a virtual carrier operation step of prohibiting transmission of a virtual carrier in a data area of a downlink subframe of a current cell, the downlink subframe overlapping with the subframe in which the predetermined indispensable information is allocated, the virtual carrier having a narrower band than a donor band.

According to the technology described in claim 16 of the present application, there is provided a radio communication method including a step of acquiring information of a frequency band in which a control area of a virtual carrier is allocated in a data area of a downlink subframe by an adjacent base station, the virtual carrier having a narrower band than a donor band, and a step of transmitting control information of a downlink subframe of a current cell without overlapping with the frequency band in which a control area C of the virtual carrier is allocated by the adjacent base station.

According to the technology described in claim 17 of the present application, there is provided a radio communication method including a step of acquiring information of a band included in a downlink subframe transmitted by an adjacent base station, the information of the band carrying control information for all terminals in the adjacent cell, and a step of transmitting a control area of a virtual carrier in a data area of a downlink subframe of a current cell in a manner that the control area does not overlap with a band for transmitting the control information by the adjacent base station, the virtual carrier having a narrower band than a donor band.

According to the technology described in claim 18 of the present application, there is provided a radio communication system including a first base station configured to allocate predetermined indispensable information at a predetermined frequency position of a data area of a downlink subframe at a predetermined position of a current cell, and a second base station configured to transmit a virtual carrier in the data area of the downlink subframe of the current cell in a manner that the virtual carrier does not overlap with the frequency position at which the predetermined indispensable information is allocated, the virtual carrier having a narrower band than a donor band.

Here, the expression "system" refers to a logical grouping of a plurality of apparatuses (and/or functional modules that realize specified functions), and does not depend on such apparatuses and/or functional modules being present inside a single housing (and the same hereinafter).

According to the technology described in claim 19 of the present application, there is provided a radio communication system including a first base station configured to allocate predetermined indispensable information in a data area of a downlink subframe at a predetermined position of a current cell, and a second base station configured to prohibit operation of a virtual carrier in a data area of a downlink subframe of a current cell, the downlink subframe overlapping with the subframe in which the predetermined indispensable information is allocated, the virtual carrier having a narrower band than a donor band.

According to the technology described in claim 20 of the present application, there is provided a radio communication system including a first base station configured to allocate predetermined indispensable information in a data area of a downlink subframe at a predetermined position of a current cell, and a second base station configured to prohibit transmission of a virtual carrier in a data area of a downlink subframe of a current cell, the downlink subframe overlapping with the subframe in which the predetermined indispensable information is allocated, the virtual carrier having a narrower band than a donor band.

According to the technology described in claim 21 of the present application, there is provided a radio communication system including a first base station configured to transmit a virtual carrier at a predetermined frequency band of a data area of a downlink subframe of a current cell, the virtual carrier having a narrower band than a donor band, and a second base station configured to transmit control information of the downlink subframe of the current cell without overlapping with the frequency band in which the control area of the virtual carrier is allocated by the first base station.

According to the technology described in claim 22 of the present application, there is provided a radio communication system including a first base station configured to transmit a subframe which includes control information for all terminals in a current cell, and a second base station configured to transmit a control area of a virtual carrier in a data area of a downlink subframe of the current cell in a manner that the control area does not overlap with a band for transmitting the control information by the first base station, the virtual carrier having a narrower band than a donor band.

Advantageous Effects of Invention

According to the technology disclosed in the present description, it is possible to provide an excellent radio communication device, a radio communication method, and a radio communication system that are capable of preferably reducing downlink inter-cell interference to a terminal in the Range Expansion Area, in a radio communications environment in which cells with different sizes are hierarchically structured, the radio communication device serving as a base station.

According to the technology disclosed in the present description, an interference problem between Macro eNodeB and Pico eNodeB can be efficiently solved, and thus the throughput of each cell can be improved.

According to the technology disclosed in the present description, a virtual carrier used in MTC can be preferably operated in a heterogeneous environment such as HetNet including combinations of different types of cells.

Other objects, features, and advantages of the technology according to the present disclosure should be apparent from the following detailed description of the embodiments and the appended drawings.

BRIEF DESCRIPTION OF DRAWINGS

FIG. 24 is a diagram illustrating an example in which no offset is provided between the subframes of the Macro eNodeB and the subframes of the Pico eNodeB.

DESCRIPTION OF EMBODIMENTS

Hereinafter, an embodiment of the technology disclosed in the present description will be described in detail with reference to the drawings.

Figure 16:
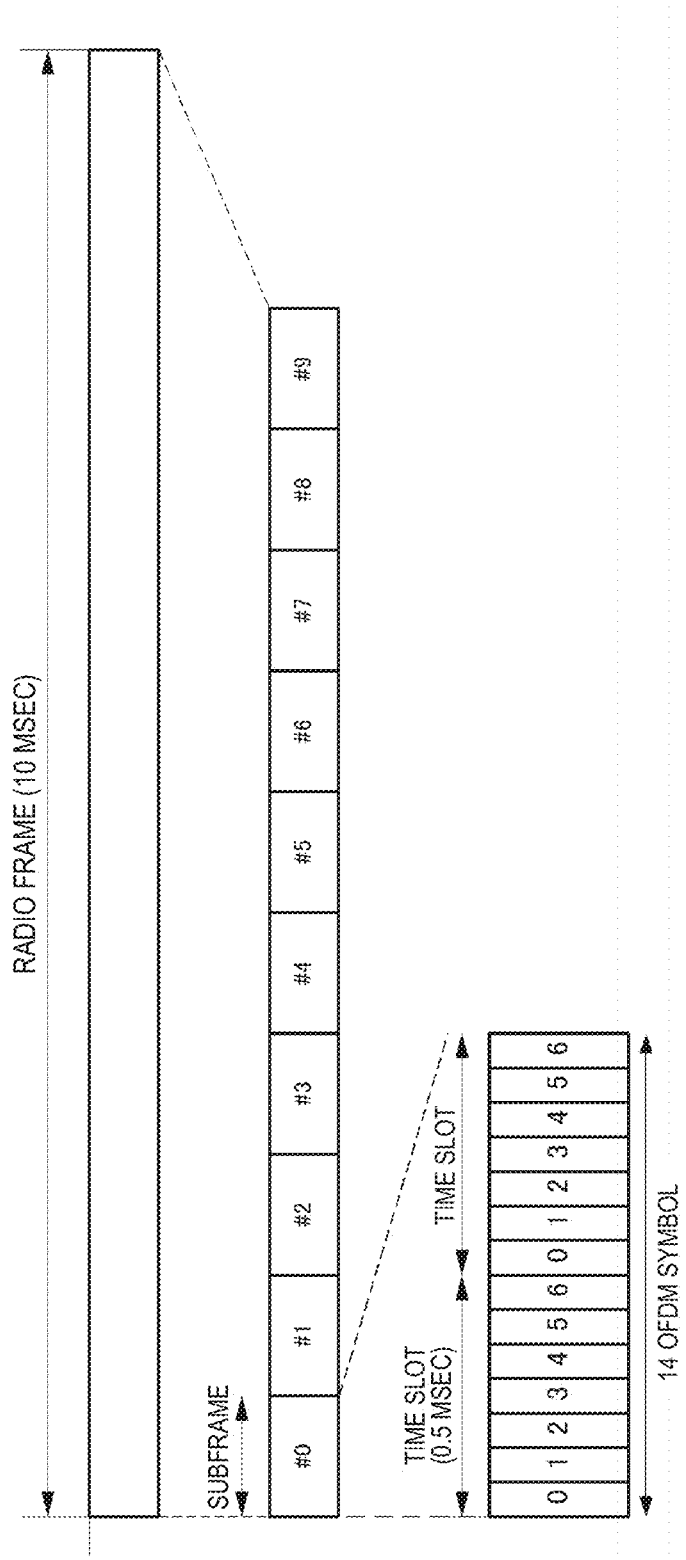
FIG. 16 is a diagram illustrating a configuration of a downlink radio frame in the LTE.

The LTE is a communication system based on OFDM modulation system, and adopts OFDMA as a downlink radio access system. FIG. 16 illustrates a configuration of a downlink radio frame in the LTE. As illustrated, the radio frame has 3 layers of hierarchy: time slot, subframe, and radio frame in increasing order of time unit.

A time slot with 0.5 millisecond length includes 7 OFDM symbols (in the case of a normal unicast transmission) and serves as a unit of a demodulation processing at the time of reception by a user (mobile station) side. A subframe with 1 millisecond length includes 2 contiguous time slots (14 OFDM symbols), and serves as a transmission time unit for a data packet on which error correction coding has been performed. A radio frame with 10 millisecond length includes 10 contiguous subframes (that is, 20 time slots), and serves as a basic unit for multiplexing all physical channels. The subframe is divided into a control area PDCCH used for control signals from an eNodeB, and a data area PDSCH used for user data.

Users can communicate with each other without mutual interference by using different sub carriers or different time slots. The LTE defines so-called "resource block (RB)" which is a minimum unit of radio resource allocation and obtained by grouping contiguous sub carriers in a block. A scheduler installed on a base station allocates a radio resource to each user in units of resource blocks. The resource block consists of 12 sub carriers×1 time lot (7 OFDM symbols=0.5 millisecond). A maximum of 3 OFDM symbols from the head of each subframe is used for the control channel, that is, the PDCCH. The scheduler of the base station can allocate a resource block every subframe interval, that is, 1 millisecond interval. Position information of the resource block is called scheduling. Uplink scheduling information and downlink scheduling information are both carried on a downlink control channel. Each user can recognize the resource block allocated to the user by referring to the control channel.

A time slot of 0.5 milli length is the minimum allocation unit which can be used by each user. The scheduler installed on the base station (eNodeB) allocates usable time slots to each user in units of time slots. In the LTE, 2 types of communication systems, FDD and TDD are available for selection. In the TDD, whether the subframe is used for uplink or downlink can be selected for each subframe.

As illustrated in FIG. 16, each downlink radio frame consists of 10 contiguous subframes, and a synchronization signal and system information are each inserted at a predetermined position.

Figure 17:
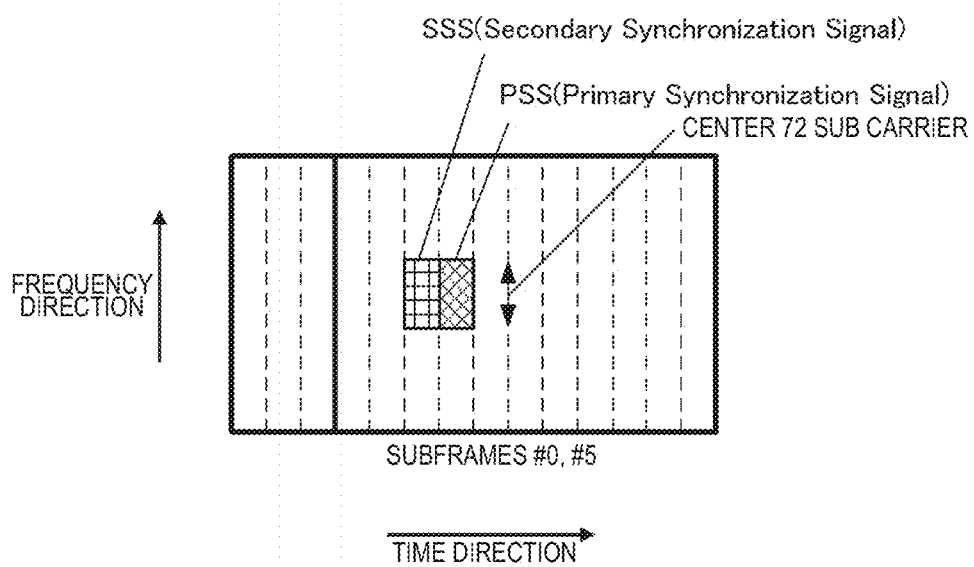
FIG. 17 is a diagram illustrating locations at which the synchronization signals PSS, SSS are inserted into a downlink subframe in FDD.
Figure 18:
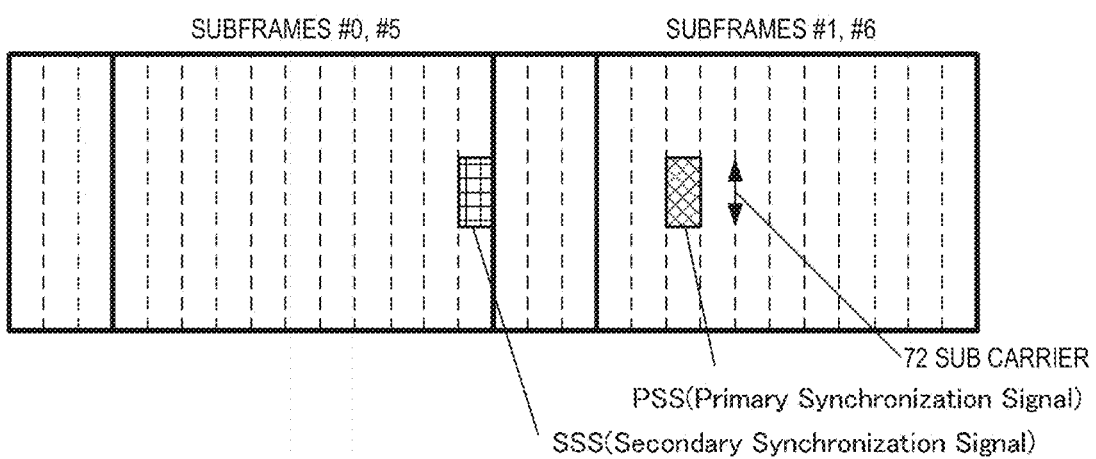
FIG. 18 is a diagram illustrating locations at which the synchronization signals PSS, SSS are inserted into a downlink subframe in TDD.

The synchronization signal has 2 types: PSS (Primary Synchronization Signal) and SSS (Secondary Synchronization Signal). The insertion position of a synchronization signal in the subframes and OFDM symbols in the radio frame varies depending on whether Duplex mode is FDD or TDD. In the FDD, as illustrated in FIG. 17, both PSS and SSS are inserted in the subframes #0 and #5. The PSS is inserted at the last OFDM symbol in the first slot, and the SSS is inserted at the last but one OFDM symbol. In the TDD, as illustrated in FIG. 18, the PSS is inserted at the position of the 6th OFDM symbol from the head of the first slot in the subframes #1 and #6, and the SSS is inserted at the last OFDM of the second slot in the subframes #0 and #5. In either case, the 72 sub carrier at the center of a usable band is used. The synchronization signals PSS, SSS are first received by a UE terminal, and thus can be considered to be the most important signals in all of the downlink signals. If the synchronization signals cannot be received, the UE terminal cannot perform a subsequent step to be associated with a cell.

Figure 19:
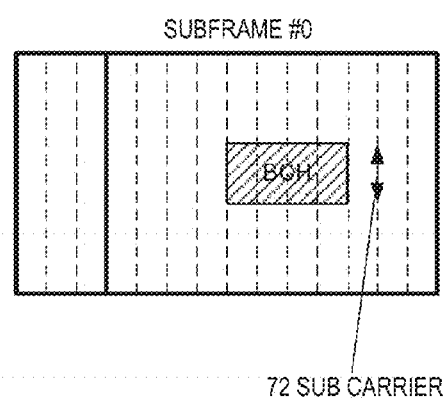
FIG. 19 is a diagram illustrating a location at which the system information BCH is inserted into a downlink subframe.

The system information includes MIB (Master Information Block) and SIB (System Information Block). The MIB stores indispensable information for receiving data in a first stage, such as a bandwidth to be used, System Frame Number, and a configuration of Hybrid ACK. Although the SIB includes other system information and is important information, MIB is more important information. The MIB is transmitted through a channel called BCH (Broadcast CHannel). It is defined that the SIB is to be transmitted through the PDSCH. In either case where Duplex mode is FDD or TDD, as illustrated in FIG. 19, the BCH is inserted at the 4th OFDM symbol from the head of the second slot in the subframe #0, and the center 72 sub carrier in the frequency band is used. Because the area of the BCH is very important, it is significantly important to reduce interference to the BCH.

Hereinafter, a downlink interference problem between a Pico eNodeB and a Macro eNodeB in a Range Expansion Area defined in the 3GPP Rel 10 will be discussed subsequent to the discussion in the section of "Background Art".

As described above, for a UE terminal in the Range Expansion Area, received power from a Macro eNodeB may be higher than the received power from the Pico eNodeB which is associated with the UE terminal. That is, the Range Expansion Area has a drawback in that the reception by the UE terminal is susceptible to interference from the Macro eNodeB.

As described above, it can be assumed that the X2 interface is present between the Macro eNodeB and the Pico eNodeB, and so interference to the PDSCH portion in each subframe has been addressed by the ICIC in the Rel 8. In the Range Expansion Area, however, even though the PDSCH portion may be adjusted using the ICIC technology in the Rel 8, a problem of interference to the PDCCH occurs.

In the Rel 8, the PDCCH is designed to resist interference between Macro eNodeBs which have comparable transmission outputs. However, in the Rel 10, because RSRP is evaluated by the Range Expansion, a high power with several 10 dB higher than the power from the Pico eNodeB is transmitted from the Macro eNodeB, thereby causing a problem that the PDCCH transmitted from the Picoe NodeB is more likely to be susceptible to interference than the PDCCH transmitted from the Macro eNodeB. Particularly, UE terminals belonging to the Range Expansion Area are unable to receive the PDCCH from the Pico eNodeB.

For this reason, the ICIC in the Rel 10 aims to reduce interference between macro cells and pico cells. The ICIC in the Rel 10 has a solution by providing some output-prohibited subframes out of 10 subframes in each radio frame transmitted by the Macro eNodeB. The output-prohibited subframe is called ABS (Almost Blank Subframe).

Figure 20:
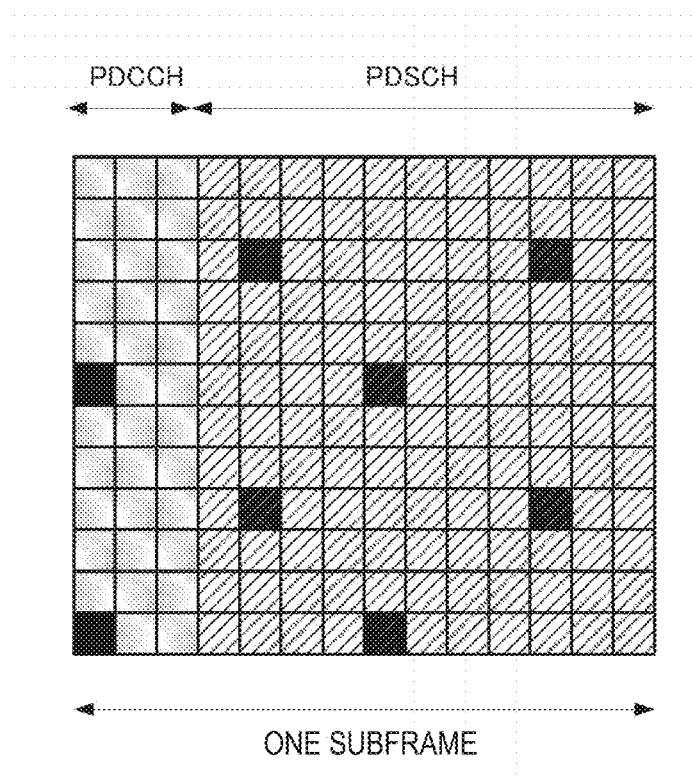
FIG. 20 is a diagram illustrating the structure of a normal subframe.
Figure 21:
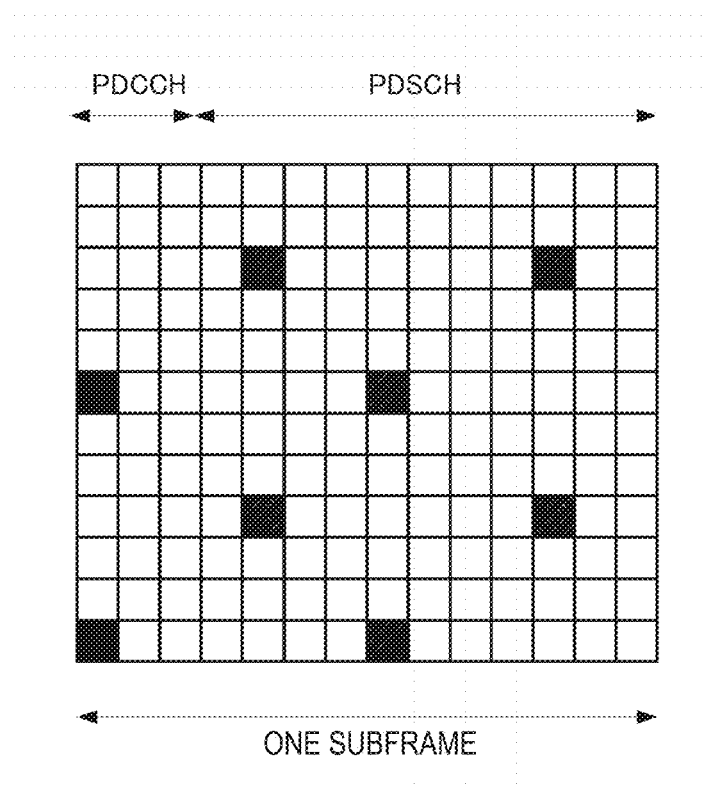
FIG. 21 is a diagram illustrating the structure of a subframe which is set as a normal ABS.

FIG. 20 illustrates the structure of a normal subframe. In FIG. 20, the horizontal axis indicates time and the vertical axis indicates frequency. Each subframe includes the control signal PDCCH from the eNodeB and the PDSCH which is used as user data (described above). In the example of FIG. 20, the OFDM symbols from the head to the third serve as the PDCCH, and the OFDM symbols on the fourth and after serves as the PDSCH. A signal called CRS (Cell-Specific Reference Signal) is inserted in both the PDCCH and the PDSCH. In FIG. 20, the resource block portions colored in black each correspond to the CRS signal. Even when a signal in a subframe for a normal download is attempted to be prohibited, only the data in the PDSCH portion can be prohibited. Prohibition of the PDSCH portion can be achieved by prohibiting the PDSCH from being allocated by the scheduler of the eNodeB. However, the eNodeB cannot prohibit the CRS of the PDSCH. Similarly, the eNodeB also cannot prohibit the Cell Specific Reference Signal of the PDCCH. That is, CRS must be inserted in a normal subframe even when an ABS is set. FIG. 21 illustrates the structure of a subframe which is set as a normal ABS, and only the resource block portion in which the CRS signal is not inserted can be prohibited.

Figure 22:
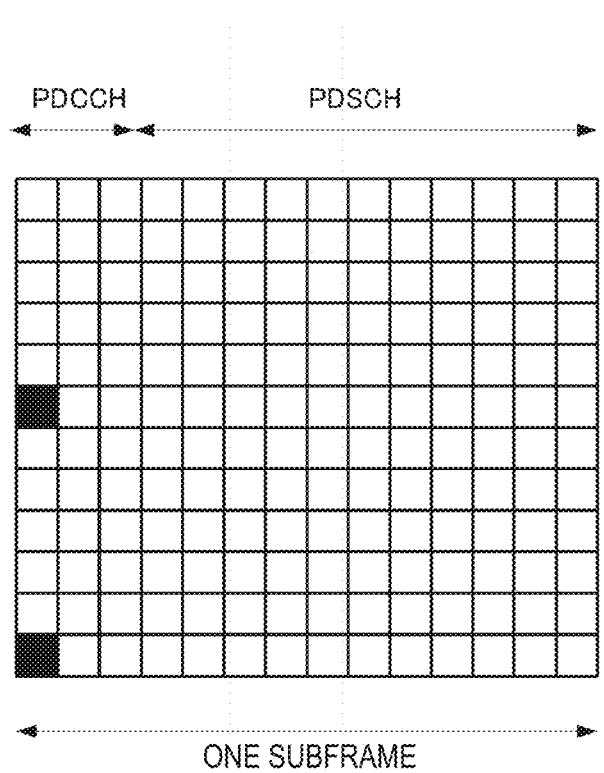
FIG. 22 is a diagram illustrating the structure of a subframe which is set as an MBSFN type ABS.

In the 3GPP Rel 10, in order to prohibit even the CRS of the PDSCH, ABS subframe is set to be a subframe in MBSFN (Multimedia Broadband Single Frequency Network). The subframe in MBSFN is a subframe which is used for broadcast using SFN, and does not allow transmission of a normal CRS. The UE terminal has a feature that when an MBSFN subframe is recognized, the UE terminal does not need to receive the CRS of the PDSCH. The CRS of the PDSCH can be prohibited by making a normal ABS subframe appear to be an MBSFN subframe for the UE terminal. However, even in an MBSFN subframe, the CRS of the PDSCH cannot be prohibited. FIG. 22 illustrates the structure of a subframe which is set as an MBSFN type ABS, and the CRS of the PDSCH cannot be prohibited.

In short, the Rel 10 includes 2 types of ABS: a normal ABS and an MBSFN type ABS. As illustrated in FIG. 21, in a normal ABS subframe, only the PDCCH and the CRS of the PDSCH remain and other resource block portions are not transmitted. As illustrated in FIG. 22, in a subframe of the MBSFN type ABS, only the CRS of the PDCCH remains and other portions are not transmitted. In FIGS. 21 and 22, the resource block portions colored in black each correspond to a CRS signal, and the white resource block portions correspond to the portions not to be transmitted.

As described above, in the Range Expansion Area, reception from the Pico eNodeB by the UE terminal is susceptible to interference from the Macro eNodeB. On the other hand, as illustrated in FIGS. 21 and 22, most part of a subframe set as an ABS is not transmitted, and consequently a subframe of the Pico eNodeB is resistant to interference, the subframe corresponding to a subframe which is set as an ABS by the Macro eNodeB. Therefore, the Pico eNodeB can perform downlink communication efficiently while avoiding interference by allocating much resources to each subframe which is set as an ABS by the Macro eNodeB, the resources being directed to the UE terminal in the Range Expansion Area.

Figure 23:
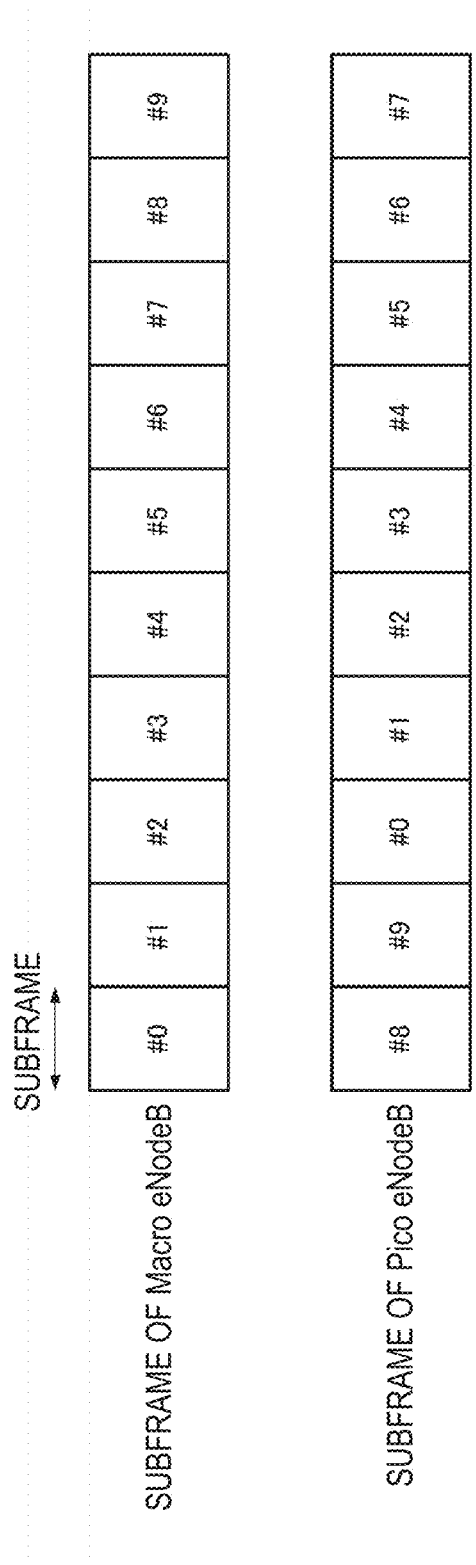
FIG. 23 is a diagram illustrating an example in which an offset is provided between the subframes of the Macro eNodeB and the subframes of the Pico eNodeB.

The subframes of the Macro eNodeB and the Pico eNodeB can be operated by providing an offset or by providing no offset between the subframes. FIG. 23 illustrates an example in which an offset is provided between the subframes of the Macro eNodeB and the subframes of the Pico eNodeB. In the example of FIG. 23, an offset by 7 subframes is provided in time direction. FIG. 24 illustrates an example in which no offset is provided between the subframes of the Macro eNodeB and the subframes of the Pico eNodeB.

As already described with reference to FIGS. 18 to 20, the synchronization signals PSS, SSS and the system information BCH, which are very important for reducing interference, are inserted at specific positions of the subframes in the radio frame. The eNodeB cannot prohibit transmission of these signals. When no offset is provided between the subframes as illustrated in FIG. 24, the insertion positions of the subframes for the synchronization signals PSS, SSS and the system information BCH are matched between the Macro eNodeB and the Pico eNodeB, and thus a conflict therebetween cannot be avoided by setting an ABS by the Macro eNodeB.

On the other hand, as illustrated in FIG. 23, with the operation by providing an offset between the subframes, the insertion positions of the subframes for the synchronization signals PSS, SSS and the system information BCH are different between the Macro eNodeB and the Pico eNodeB. For example, it is sufficient for the Pico eNodeB to provide an offset so as to be able to transmit the synchronization signal PSS, SSS and the system information BCH with a subframe which is set as an ABS by the Macro eNodeB. Consequently, in consideration of the signal interference of the synchronization signals PSS, SSS and the system information BCH between the eNodeBs, the operation of providing an offset between the subframes of the Macro eNodeB and the Pico eNodeB will probably be more common.

As additional remark, in a subframe which has been set as an ABS, transmission of both the PDCCH and the PDSCH is almost prohibited. The interference to the PDSCH portion in the subframes has been addressed by the ICIC in the Rel 8 as described above. The reason why transmission of even the PDSCH is prohibited nonetheless in the ABS is that the PDCCH includes the scheduling information indicating which resource blocks are to be used for reception by each UE terminal. It is not possible to transmit the PDSCH while prohibiting the transmission of the PDCCH only.

Hereinafter, a method of decoding the PDCCH will be described.

Transmission of the PDCCH is performed in units of Resource Element called CCE (Control Channel Element) consisting of 36 symbols. Because the PDCCH is modulated by QPSK (Quadrature Phase Shift Keying), 72-bit information can be transmitted per one unit of CCE. Aggregation, that is, repeated transmission of the same information is applied to the CCE. The number of repeat, that is, CCE Aggregation Level may have the following values: 1, 2, 4, and 8. It is obvious that SN is improved as the CCE Aggregation Level is increased. For a cell having a larger radius, the CCE Aggregation Level is increased in order to prevent reduction in SN.

When the UE terminal cannot recognize the location of the CCE addressed to the UE terminal, Blind decoding, that is, decoding is performed anyway. When a CRC (Cyclic Redundancy Check) error does not occur, the UE terminal recognizes that the CCE is addressed to itself. In the eNodeB, the CRC is assigned to each CCE using a number specific to the UE terminal (UE identity=C-RNTI (Cell Radio Network Temporary Identity), and thus when the CCE is checked for the CRC, an error should occur in any UE terminal except for the corresponding UE terminal.

The above-mentioned Blind decoding decodes all the CCEs inserted in the control area PDCCH of the subframes, and a load for the UE terminal increases. For this reason, Search Space has been introduced in the Rel 8. The Search Space is divided into Common Search Space and UE Specific Search Space. The former Common Search Space is contiguously allocated from the head of a candidate CCE. The Common Search Space is present only when the CCE Aggregation Level=4, 8 (in other words, the Common Search Space is present only when a cell has a large radius). In addition, the area for the Common Search Space needs 16 CCEs. Because each CCE has 36 symbols, 576 sub carriers from the first OFDM symbol in increasing order of frequency correspond to the Common Search Space.

The CCE in the UE Specific Search Space is encoded by masking the CRC using the UE identity. Thus, the UE terminal performs Blind decoding on the UE Specific Search Space, that is, performs the CRC check using its own UE identity. When a CRC error does not occur, the UE terminal can recognize that the CCE is addressed to itself. All the UE terminals are configured to attempt to perform Blind decoding on the Common Search Space using 2 identities, UE identity and Common identity The eNodeB and each UE terminal have a common function (hash function) for determining the location of the UE Specific Search Space. When a UE identity and a subframe number are inputted to the function, the Search Space within the UE Specific Search Space in the subframe, that is, the location of the CCE to be decoded by the UE terminal can be obtained as the output of the function. The hash function is a function which outputs a random looking value for an input (well known). When a UE identity and a subframe number are inputted to the hash function, a random looking area within a certain range is outputted. Therefore, when a UE identity or a subframe is varied, a different Search Space is outputted from the hash function in almost all cases. Even when the calculation of the function accidentally generates the same Search Space for 2 or more UE terminals, it is highly probable that the calculation generates different Search Spaces in the subsequent subframe.

In the LTE, 6 types of bandwidths from 1.4 to 20 MHz are available for selection. The number of sub carriers in each bandwidth is shown in the following table 1.

TABLE 1

| Bandwidth | The number of sub carriers |
| --- | --- |
| 1.4M | 76 |
| 3M | 151 |
| 5M | 301 |
| 10M | 601 |
| 15M | 901 |
| 20M | 1201 |

In each bandwidth, the number of CCEs included in 1 OFDM symbol is the value obtained by dividing the number of sub carriers by 36. Thus, when the bandwidth is 20 MHz, it can be seen from the above table 1 that the number of CCEs included in 1 OFDM symbol is 1201/36≈approximately 33.

By the way, a communication network has increasing application to an object other than a common terminal such as a conventional cellular phone or a PC (Personal Computer) which is directly accessed by a user. Hereinafter, communication which is performed between machines and not directly accessed by a user is referred to as MTC (Machine Type Communication), and a terminal which is not directly accessed by a user for communication is referred to as an MTC terminal. In general, the MTC is synonymous with the technology referred to as an M2M (Machine to Machine). The antonym of M2M is H2H (Human To Human).

The MTC terminal generally communicates with a server without human intervention. For example, medical applications include transmission of medical information to a server. That is, electrocardiograms of subjects are collected, and when certain trigger conditions are met, the collected information is transmitted to the server side using an uplink. Other applications include a vending machine. A server side can order a vending machine to report sales for every fixed cycle (for example, 30 days), the vending machine being managed by the server.

The features of the MTC include, for example, the following:
(1) Almost no movement involved.
(2) Small amount of data transfer.
(3) Extremely low power consumption.
(4) MTC terminals are grouped to be handled.

Although the above-mentioned features are general, the MTC does not need to have all the above features. Which combination of the above-mentioned features is depends on application. It is also necessary to note that MTC can exhibit various features.

In contrast to a normal voice terminal, MTC is assumed to be mounted on a device which involves no human intervention. Thus, it is expected that more MTC terminals than the cellular phone terminals in number will be on the market in the future.

With an increasing number of MTC terminals, concerns are rising that congestion may occur at a base station or in a core network due to transmission and reception requests which are made to the base station all at once. In order to promote the spread of the MTC terminals, reduction in cost is desired. In addition, the MTC terminals and conventional cellular phone terminals need to be able to coexist. Creating a new cellular network having only the MTC terminals is impractical in terms of cost.

As one of the methods to reduce the cost of the MTC terminal, the frequency band used by the MTC terminal may be limited to a narrow band. This is called "virtual carrier" or "narrow band operation". The LTE can have a maximum bandwidth of 20 MHz (the maximum bandwidth is called a "donor band"). The narrow band operation is a method of limiting the frequency band used by MTC terminal to 1.4 MHz. In the conventional LTE terminals, the LTE terminal of Category 1 is defined as the terminal which uses 1.4 MHz at the center, and only uses the center frequency of 1.4 MHz. On the other hand, the narrow band operation allows any 1.4 MHz band in 20 MHz bandwidth to be used.

In the narrow band operation, the general view is that PDCCH serving as control signals should be included in the area of conventional PDSCH. This is because, in consideration of coexistence of the narrow band operation of MTC and the conventional LTE standard, PDCCH at the time of the narrow band operation of MTC should not be allocated in the area of conventional PDSCH. In addition, because the number of terminals in MTC tends to increase, a problem also occurs in that the resources for the conventional PDCCH may be exhausted. Consequently, it is natural to assume that PDCCH in MTC is included in the area of PDSCH. Hereinafter, the control area PDCCH in MTC is referred to as PDCCH_MTC. The data area PDSCH in MTC is referred to as PDSCH_MTC.

The interference problem between Macro eNodeB and Pico eNodeB can be divided into two cases: one case where synchronization is perfect between eNodeBs and the case where synchronization is not perfect between eNodeBs, and the other case where the virtual carrier causes interference and the case where the virtual carrier receives interference.

Problem 1: interference from BCH, PSS, SSS to PDCCH_MTC. First, an interference problem of the virtual carrier will be discussed, in the case where synchronization is perfect between a Macro eNodeB and a Pico eNodeB (an offset is provided in units of subframes (see FIG. 23), but no time difference is provided in units of OFDM symbols).

Figure 1:
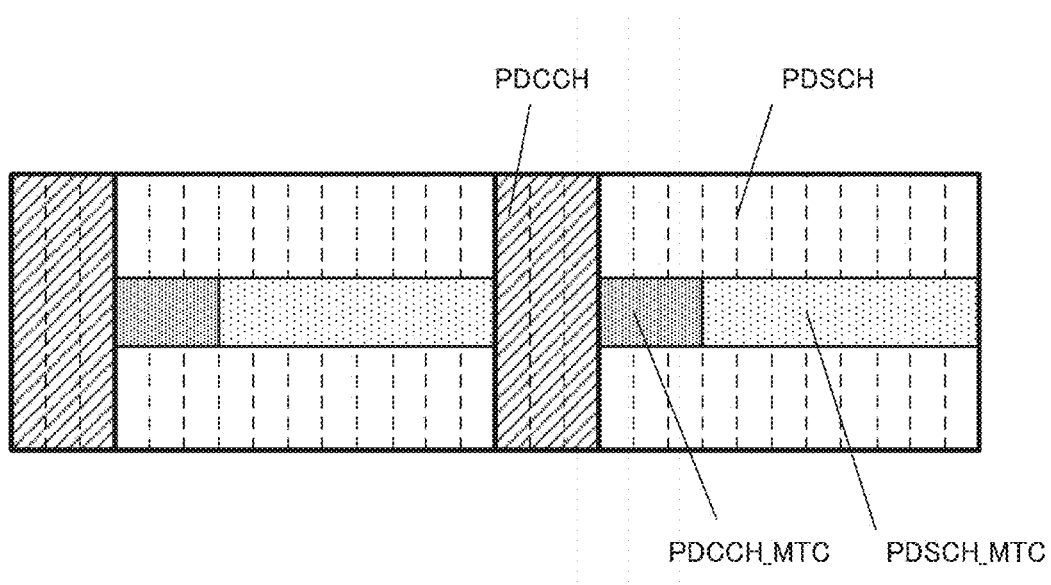
FIG. 1 is a diagram illustrating the manner in which a control area PDCCH_MTC for operating a narrow band and a data area PDSCH_MTC are allocated in a data area PDSCH of a donor band.

As described above, in order to reduce the cost for terminals in MTC, operation of the narrow band (virtual carrier operation) is expected. In the operation of the narrow band, any narrow band in the donor band of 20 MHz of the eNodeB is selected. As illustrated in FIG. 1, the control area PDCCH_MTC and the data area PDSCH_MTC in the arrow band operation, that is, the virtual carrier are both allocated in the data area PDSCH of the donor band. This is because MTC can only receive the width of the narrow band, and so cannot receive all PDCCHs of the donor band and decode them.

Here, the virtual carrier including PDCCH_MTC and PDSCH_MTC is assumed to be a carrier (that is, the virtual carrier is subject to interference) transmitted from the Pico eNodeB (node having low power transmission).

In the PDSCH in a predetermined subframe transmitted from the Macro eNodeB, the system information BCH and the synchronization signals PSS, SSS are inserted at the position of the center 72 sub carrier of the donor band (see FIGS. 17 to 19). Avoiding interference between these signals and the PDCCH_MTC transmitted from the Pico eNodeB is a technical challenge to achieve the narrow band operation of MTC. Normally, for the PDSCH in a subframe, an interference area can be adjusted via the X2 interface which is prepared by the ICIC in the Rel 8 (described above). However, because the BCH, PSS, SSS are important information, the Macro eNodeB cannot prohibit the transmission of these. On the other hand, the control information for MTC is inserted in the PDCCH_MTC which is subject to interference, thus when the PDCCH_MTC receives interference, a problem arises in that the PDSCH_MTC cannot be transmitted and received.

It should be reconfirmed that this problem concerns the influence of the BCH, PSS, SSS of the Macro eNodeB on the virtual carrier of the Pico eNodeB. For the virtual carrier in the Macro eNodeB, naturally, the virtual carrier is transmitted without overlapping with the same locations as those of the BCH and PSS, SSS of the Macro eNodeB, and so no problem arises.

Now, a question may arise that when the positions of the BCH, PSS, SSS of the Macro eNodeB are the same as those of the BCH, PSS, SSS of the Pico eNodeB even between the Macro eNodeB and the Pico eNodeB, the PDCCH_MTC of the Pico eNodeB is allocated so as not to overlap with the positions of the BCH, PSS, SSS of the Pico eNodeB, and consequently, the PDCCH_MTC of the Pico eNodeB does not overlap with the BCH, PSS, SSS of the Macro eNodeB.

Figure 2:
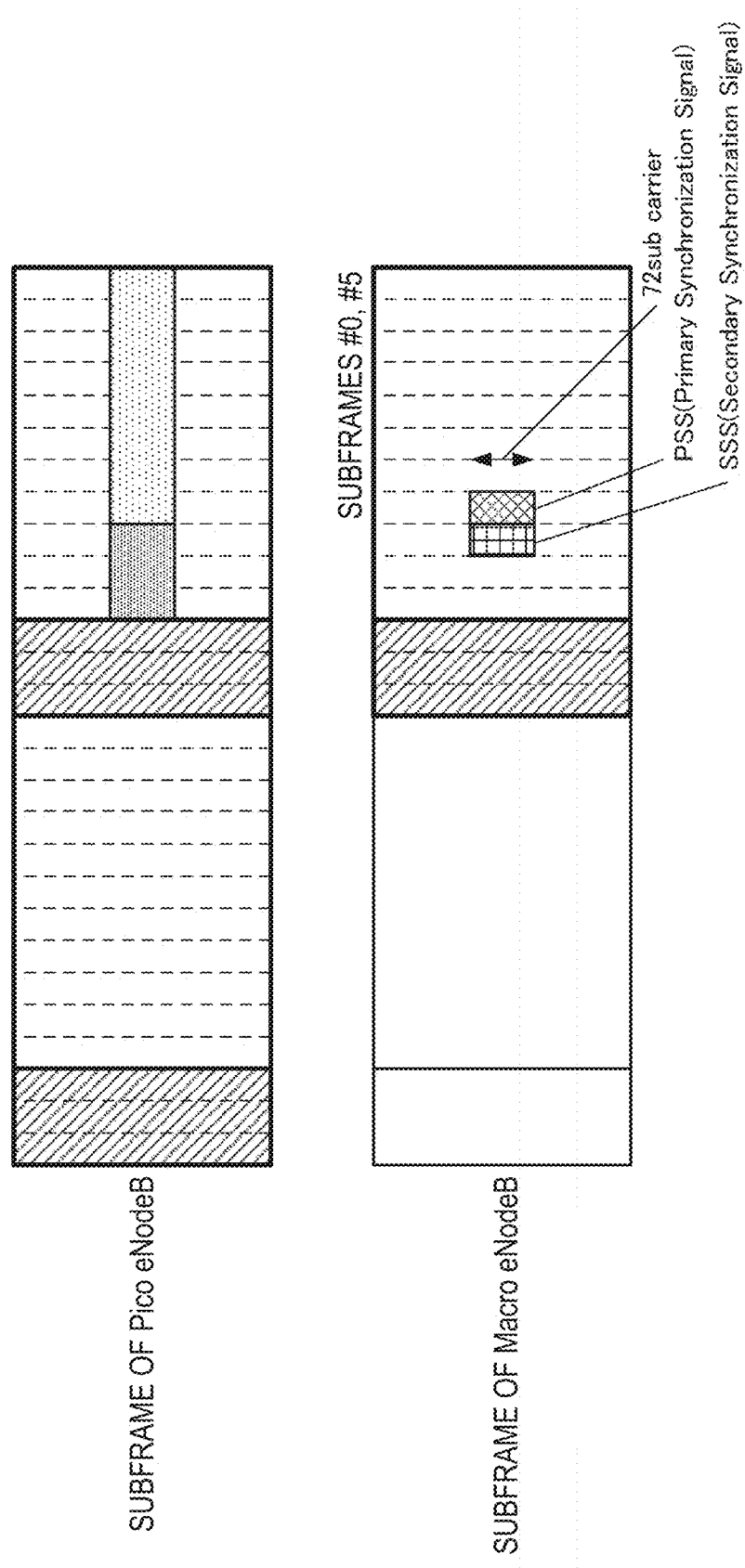
FIG. 2 is a diagram illustrating the case where a PDCCH_MTC of a Pico eNodeB, and PSS, SSS of a Macro eNodeB overlap each another.

However, this question is not valid. As illustrated in FIG. 23, the ICIC in the Rel 10 is expected to adopt the operation of providing an offset between the subframes of the Macro eNodeB and the subframes of the Pico eNodeB. In this case, although the boundaries between the subframes are the same and synchronized with each other (in units of OFDM symbols), the positions of the BCH, PSS, SSS of the Macro eNodeB and the positions of the BCH, PSS, SSS of the Pico eNodeB are different because of the offset provided. Therefore, there is a case where the PDCCH_MTC of the Pico eNodeB overlaps with the BCH, PSS, SSS of the Macro eNodeB. FIG. 2 illustrates the manner in which the PDCCH_MTC of the Pico eNodeB overlaps with the PSS, SSS which are inserted in the PDSCH of the subframes #0, #5 of the Macro eNodeB. In such a case, transmission of the BCH, PSS, SSS of the Macro eNodeB cannot be prohibited (interference is adjusted via the X2 interface) utilizing the ICIC in the Rel 8, thereby causing high interference to the PDCCH_MTC of the Pico eNodeB. Interference to the PDSCH_MTC can be avoided by the ICIC in the Rel 8, however, the interference to the PDCCH_MTC is serious.

Method 1-1: proposed is an interference avoidance method by which the virtual carrier is allocated so as not to overlap with the position of the center 72 sub carrier of the donor band.

Figure 3:
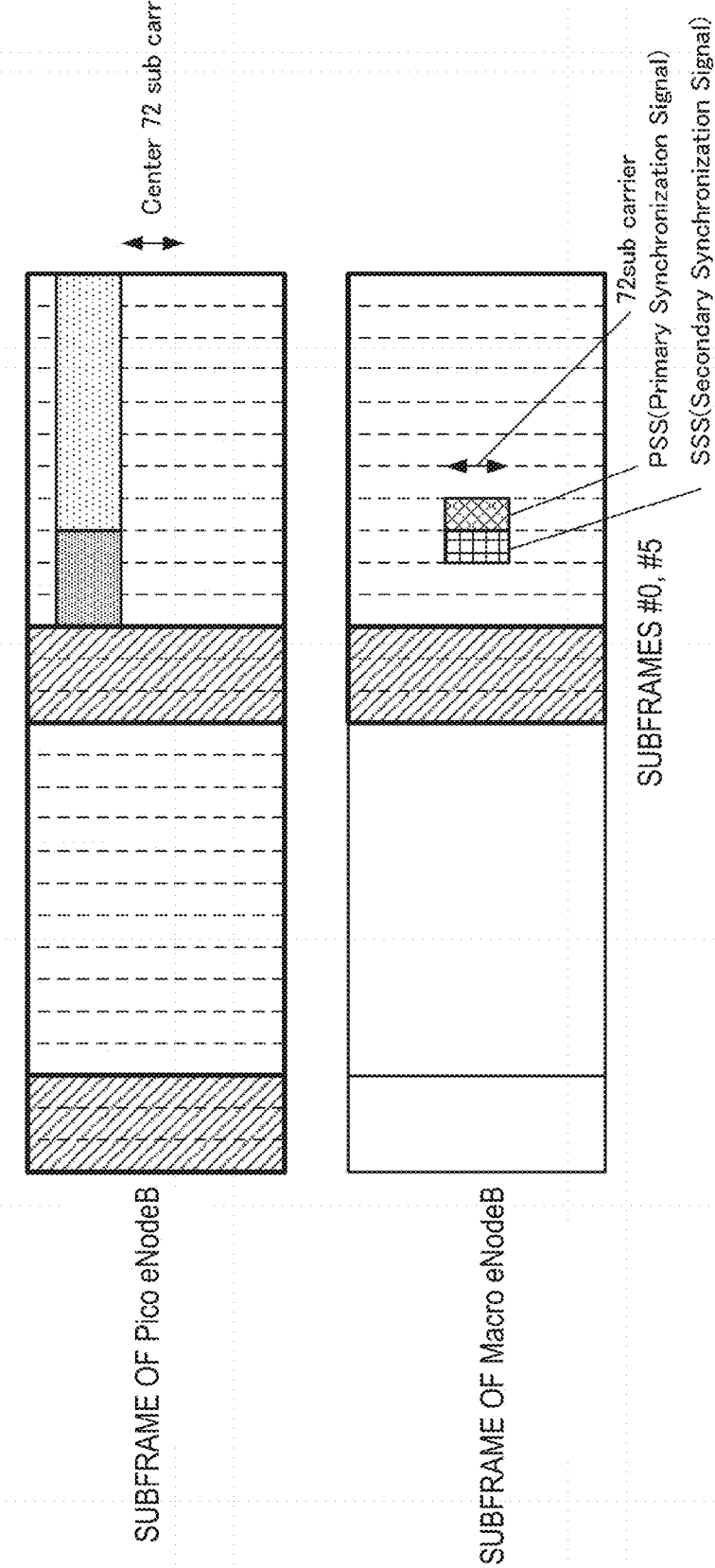
FIG. 3 is a diagram illustrating the manner in which a narrow band used by a virtual carrier is allocated so as not to overlap with a center 72 sub carrier of the donor band.

FIG. 3 illustrates the manner in which the narrow band used by the virtual carrier is allocated so as not to overlap with center 72 sub carrier of the donor band. By using this method, the PDCCH_MTC is not allocated at the same locations in frequency as those of the BCH, PSS, SSS, and thus interference from the BCH, PSS, SSS to the PDCCH_MTC can be preferably avoided. FIG. 3 illustrates an example in which the method is applied when synchronization between the Macro eNodeB and the Pico eNodeB is perfect (an offset is provided in units of subframes, but no time difference is provided in units of OFDM symbols). Of course, the method can be similarly applied even when synchronization is not perfect. FIG. 3 illustrates an example in which the virtual carrier is operated by the Pico eNodeB side. The method, however, can be applied even when the virtual carrier is operated by the Macro eNodeB.

The Pico eNodeB communicates with the Macro eNodeB through the X2 interface, S-GW (Serving Gateway), and MME (Mobility Management Entity) to recognize the positions of the subframes, at which the control signal BCH and the synchronization signals PSS, SSS are inserted by the Macro eNodeB side. In a subframe of a current cell of the Pico eNodeB, which overlaps with the subframes where the control signal BCH and the synchronization signals PSS, SSS are inserted by the Macro eNodeB side, the Pico eNodeB transmits the virtual carrier so as not to overlap with the center 72 sub carrier of the donor area where the BCH, PSS, SSS are allocated.

Method 1-2: proposed is an interference avoidance method by which the operation of the virtual carrier is prohibited in a specific subframe.

When the narrow band operation with the virtual carrier is allocated at the center 72 sub carrier of the donor band, the operation is prohibited in the subframes where the BCH, PSS, SSS are present. The subframes where the BCH, PSS, SSS are present are different between downlink in FDD and downlink in TDD (see FIGS. 17 to 19). The cases of FDD and TDD will be separately described in the following.

In the case of FDD, the operation of a virtual carrier is prohibited, the virtual carrier being allocated at the center 72 sub carrier of the Pico eNodeB corresponding to the subframes #0, #5 of the Macro eNodeB. In the case of TDD, the operation of a virtual carrier is prohibited, the virtual carrier being allocated at the center 72 sub carrier of the Pico eNodeB corresponding to the subframes #0, #1, #5, #6 of the Macro eNodeB.

The method can be applied when the synchronization between the Macro eNodeB and the Pico eNodeB is perfect as well as when the synchronization is not perfect therebetween. In addition, the method can be applied in both situations when the virtual carrier is operated by the Macro eNodeB and when the virtual carrier is operated by the Pico eNodeB.

The Pico eNodeB communicates with the Macro eNodeB through the X2 interface, S-GW, and MME to recognize the positions of the subframes, at which the control signal BCH and the synchronization signals PSS, SSS are inserted by the Macro eNodeB side. The Pico eNodeB prohibits the operation of the virtual carrier in the subframes of the current cell which are overlapped with the subframes in which the control signal BCH and the synchronization signals PSS, SSS are inserted by the Macro eNodeB side.

Method 1-3: proposed is an interference avoidance method by which the control area PDCCH_MTC of the virtual carrier is prohibited so as not to overlap with a specific subframe.

Figure 4:
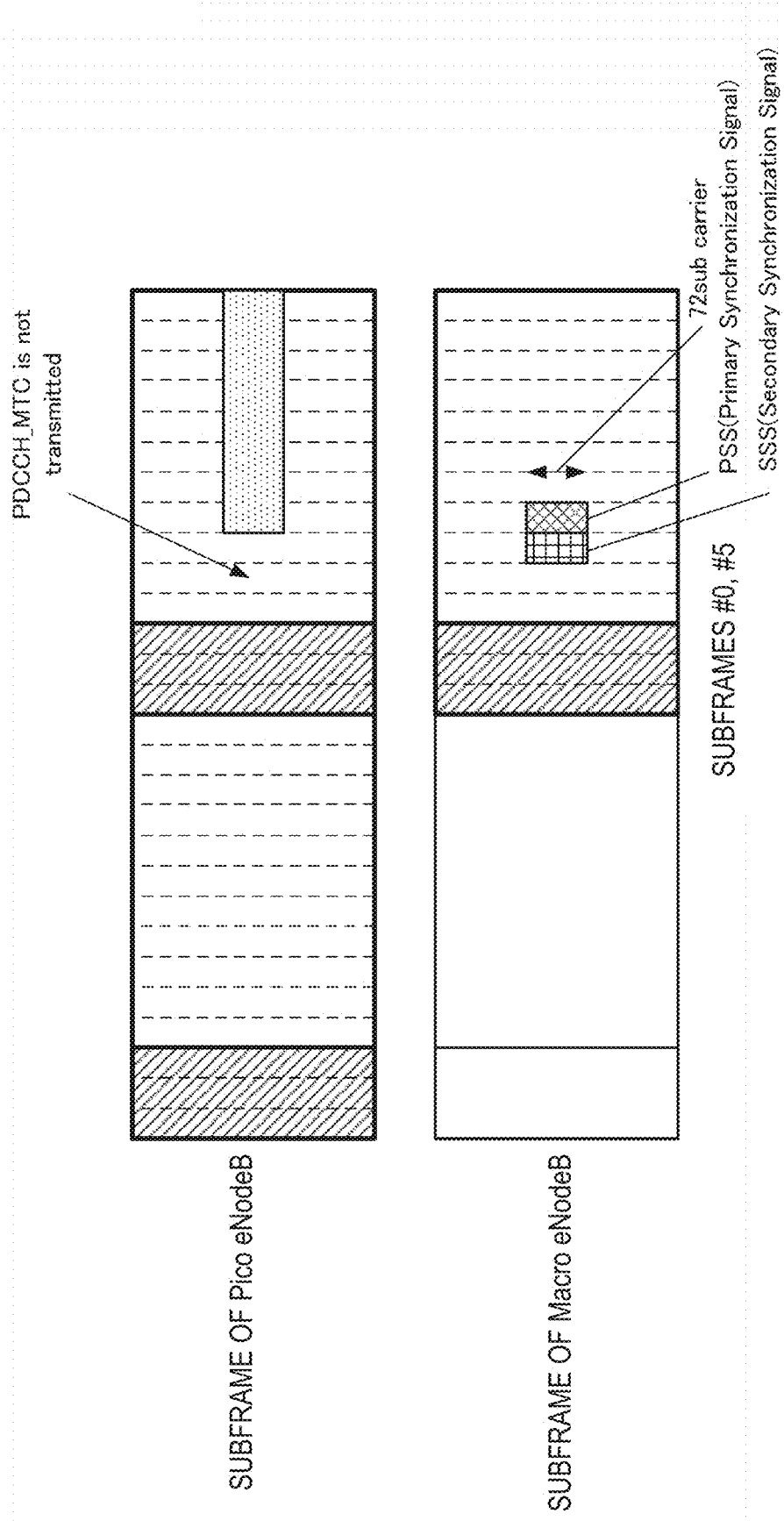
FIG. 4 is a diagram illustrating the manner in which the control area PDCCH_MTC of the virtual carrier is prohibited from being allocated in a subframe where the BCH, PSS, SSS are present.

PDCCH_MTC is not transmitted in a subframe which overlaps with the subframes where BCH, PSS, SSS are present. However, the method 1-3 differs from the method 1-2 in that the method 1-2 causes the operation of the entire virtual carrier to be prohibited in the subframes where BCH, PSS, SSS are present, whereas the method 1-3 causes the transmission of the control area PDCCH_MTC to be prohibited but allows the operation of the data area PDSCH_MTC to be performed. FIG. 4 illustrates an example in which the method 1-3 is applied when synchronization between Macro eNodeB and Pico eNodeB is perfect (an offset is provided in units of subframes, but no time difference is provided in units of OFDM symbols). In the example of FIG. 4, the virtual carrier is operated by the Pico eNodeB side, and Pico eNodeB prohibits the control area PDCCH_MTC of the virtual carrier in the subframes where BCH, PSS, SSS are present on the Macro eNodeB side. Of course, the method 1-3 can be applied even when the virtual carrier is operated by Macro eNodeB. Here, interference between PDSCH_MTC and BCH, PSS, SSS is avoided by the ICIC in the Rel 8 (interference is adjusted via the X2 interface). Normally, the interference with BCH, PSS, SSS is reduced by a method of reducing the transmission of PDSCH_MTC from Pico eNodeB.

The Pico eNodeB communicates with the Macro eNodeB through the X2 interface, S-GW, and MME to recognize the positions of the subframes, at which the control signal BCH and the synchronization signals PSS, SSS are inserted by the Macro eNodeB side. In a subframe of the current cell of Pico eNodeB, which overlaps with the subframes where the control signal BCH and the synchronization signals PSS, SSS are inserted by the Macro eNodeB side, transmission of the control area PDCCH_MTC of the virtual carrier is prohibited.

Figure 9:
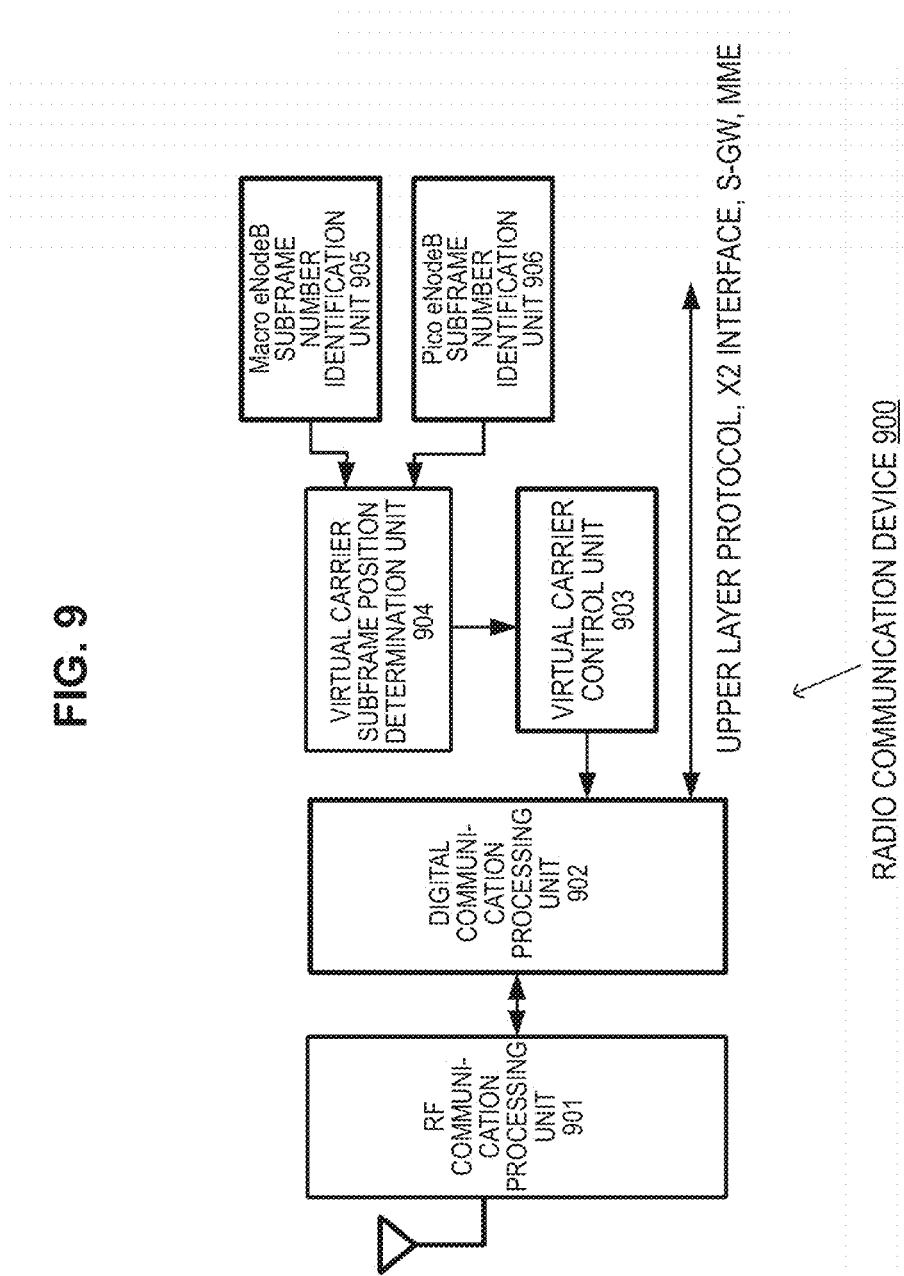
FIG. 9 is a diagram schematically illustrating a configuration example of radio communication device 900 which serves as the Pico eNodeB.

FIG. 9 schematically illustrates a configuration example of a radio communication device 900 which serves as the Pico eNodeB to achieve the above-described methods 1-1, 1-2, 1-3.

The radio communication device 900 includes an RF communication processing unit 901 to perform an analog processing on a radio signal which is transmitted/received via an antenna, and a digital communication processing unit 902 to perform modulation processing on a digital transmission signal and demodulation processing on a digital reception signal. The digital communication processing unit 902 exchanges transmission/reception data with an upper layer protocol of a communication layer of the radio communication device 900. In addition, the digital communication processing unit 902 communicates with another eNodeB through the X2 interface, S-GW, and MME.

A Macro eNodeB subframe number identification unit 905 identifies the subframe number on the Macro eNodeB side of a macro cell including the pico cell (Range Expansion Area) of itself. A Pico eNodeB subframe number identification unit 906 identifies the subframe number of the pico cell of itself.

A virtual carrier subframe position determination unit 904 determines the position of a subframe for transmitting the virtual carrier based on the subframe number on the Macro eNodeB side and the subframe number of the pico cell. The position of the subframe determined here is informed to a UE terminal (MTC terminal) in the pico cell using, for example, a BCH signal.

A virtual carrier control unit 903 controls the operation of the virtual carrier based on a result determined by the virtual carrier subframe position determination unit 904. In the method 1-1, when the current subframe number on the Macro eNodeB side indicates a subframe including a signal such as BCH, PSS, SSS, the virtual carrier subframe position determination unit 904 determines a frequency position so as not to overlap with the center 72 sub carrier of the donor band. In the method 1-2, when the current subframe number on the Macro eNodeB side indicates a subframe including a signal such as BCH, PSS, SSS, the virtual carrier subframe position determination unit 904 determines to prohibit the operation of the virtual carrier. In the method 1-3, when the current subframe number on the Macro eNodeB side indicates a subframe including a signal such as BCH, PSS, SSS, the virtual carrier subframe position determination unit 904 determines prohibit the transmission of the control area PDCCH_MTC of the virtual carrier and to reduce the transmission of the PDSCH_MTC by adjustment via the X2 interface.

Figure 10:
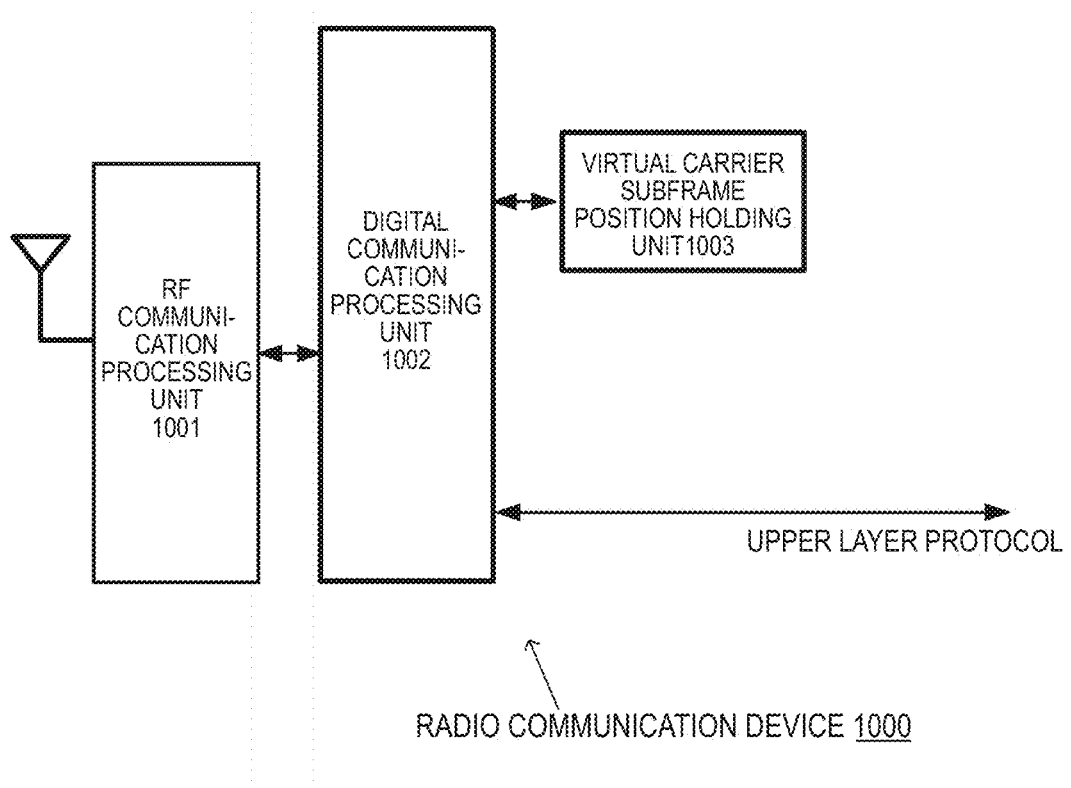
FIG. 10 is a diagram schematically illustrating a configuration example of radio communication device 1000 which operates as a UE terminal belonging to the Pico eNodeB illustrated in FIG. 9.

FIG. 10 schematically illustrates a configuration example of the radio communication device 1000 which serves as a UE terminal (MTC terminal) belonging to the Pico eNodeB illustrated in FIG. 9.

The radio communication device 1000 includes an RF communication processing unit 1001 to perform an analog processing on a radio signal which is transmitted/received via an antenna, and a digital communication processing unit 1002 to perform modulation processing on a digital transmission signal and demodulation processing on a digital reception signal. The digital communication processing unit 1002 exchanges transmission/reception data with an upper layer protocol of a communication layer of the radio communication device 1000.

The radio communication device 1000 is informed of the position of a subframe for transmitting the virtual carrier from the Pico eNodeB, for example, by a BCH signal. The virtual carrier subframe position holding unit 1003 stores the position of a subframe in the pico cell including itself, the subframe having the virtual carrier inserted therein. The digital communication processing unit 1002 performs reception processing for the virtual carrier at the position of the subframe in which the virtual carrier is inserted.

Figure 11:
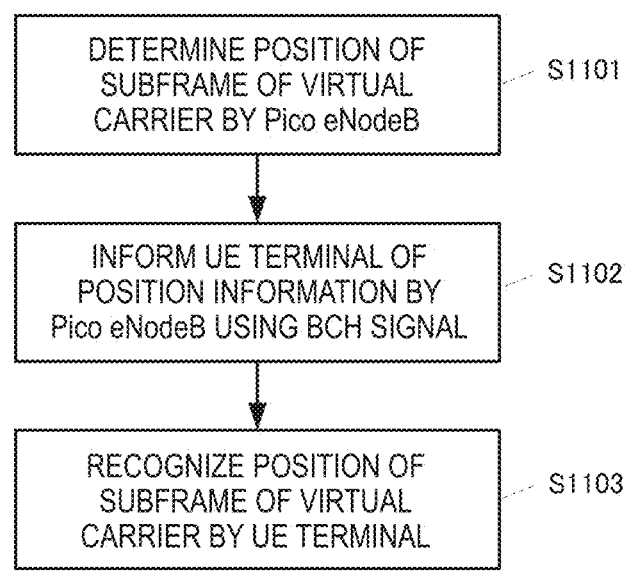
FIG. 11 is a flow chart illustrating an operational procedure for using a virtual carrier in a pico cell.

FIG. 11 illustrates an operational procedure in a flow chart format for operating the virtual carrier in the pico cell.

The Pico eNodeB determines the position of a subframe for transmitting the virtual carrier in the pico cell of itself (step S1101).

Subsequently, the Pico eNodeB informs a UE terminal (MTC terminal) in the current cell of the above-mentioned information determined in step S1101 using a BCH signal (step S1102).

The UE terminal (MTC terminal) then recognizes the position of a subframe in which the virtual carrier is inserted and performs reception processing (step S1103).

Problem 2: interference from PDCCH to PDCCH_MTC

Here, the virtual carrier including the PDCCH_MTC and the PDSCH_MTC is assumed to be a carrier (that is, the virtual carrier is subject to interference) transmitted from a Pico eNodeB (node having low power transmission). However, a similar problem arises even when the virtual carrier causes interference, and the problem can be solved by the below-described method.

The problem arises in the case where synchronization between the Macro eNodeB and the Pico eNodeB is not perfect. For example, this is the case where synchronization accuracy of the Pico eNodeB cannot be assured and a difference in units of OFDM symbols occurs between the Macro eNodeB and the Pico eNodeB.

Even when synchronization is not perfect, the problem 1 may occur, that is, interference to the PDCCH_MTC by the Pico eNodeB due to the BCH, PSS, SSS transmitted from the Macro eNodeB may still occur. However, the problem 2 will be discussed only in terms of the effect of the PDCCH transmitted from the Macro eNodeB on the PDCCH_MTC of the Pico eNodeB.

Figure 5:
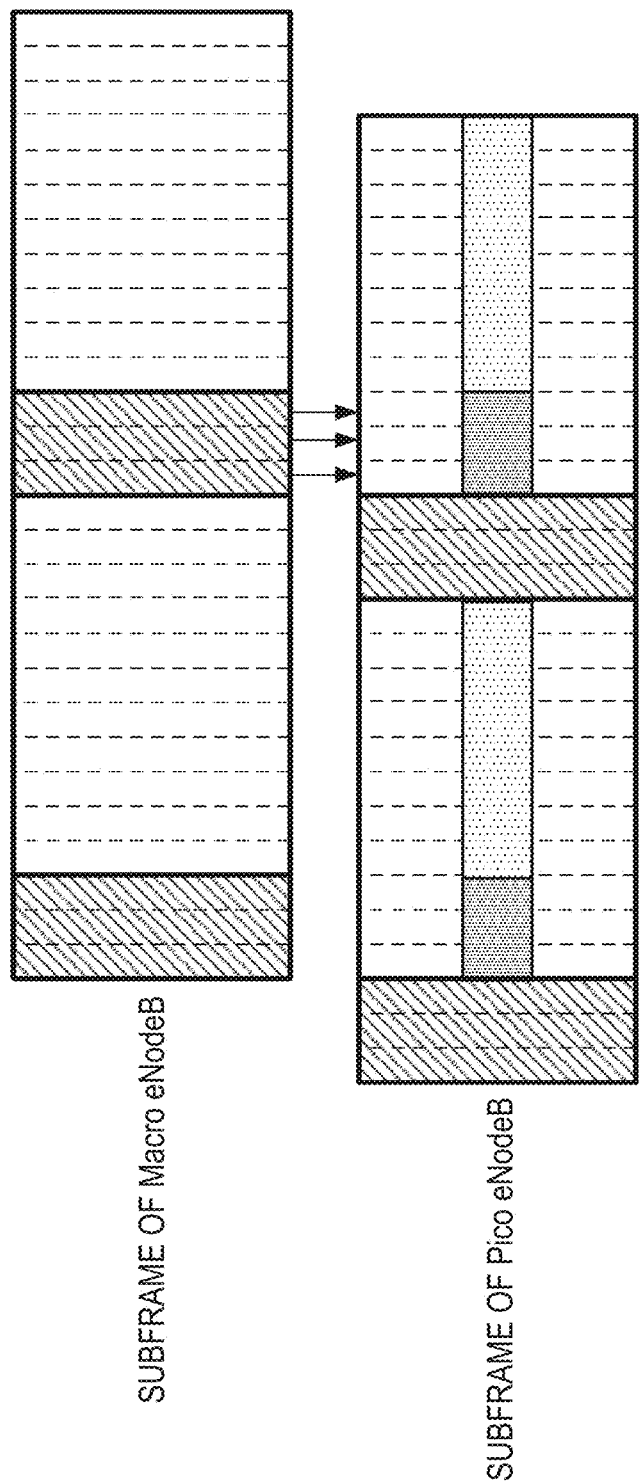
FIG. 5 is a diagram illustrating the manner in which the positions of the PDCCH of the Macro eNodeB and the PDCCH_MTC of the Pico eNodeB overlap each other.

The positions of the PDCCH of the Macro eNodeB and the PDCCH_MTC of the Pico eNodeB overlap depending on a direction of deviation in synchronization between the Macro eNodeB and the Pico eNodeB, and consequently, it is conceivable that receiving the PDCCH_MTC will be difficult for the UE terminals in the Range Expansion Area of the Pico eNodeB. FIG. 5 illustrates the manner in which the positions of the PDCCH of the Macro eNodeB and the PDCCH_MTC of the Pico eNodeB overlap each other.

This includes not only the case where synchronization accuracy of the Pico eNodeB cannot be assured, but also the case where PDCCHs are shifted on purpose (intentionally) in units of OFDM symbols in order to reduce interference between the PDCCHs of the Macro eNodeB and the PDCCHs of the Pico eNodeB. Referring to FIG. 5 again, the positions of the PDCCHs of the Macro eNodeB and the PDCCHs of the Pico eNodeB are not overlapped each other, and so it is not necessary to place higher priority on one PDCCH and to prohibit the another PDCCH. Thus, it is important to reduce the interference to the control area PDCCH_MTC of the virtual carrier under such situations.

Method 2-1: proposed is a method of limiting the range of UE Specific Search Space in the PDCCH of an eNodeB as an interference source.

Figure 6:
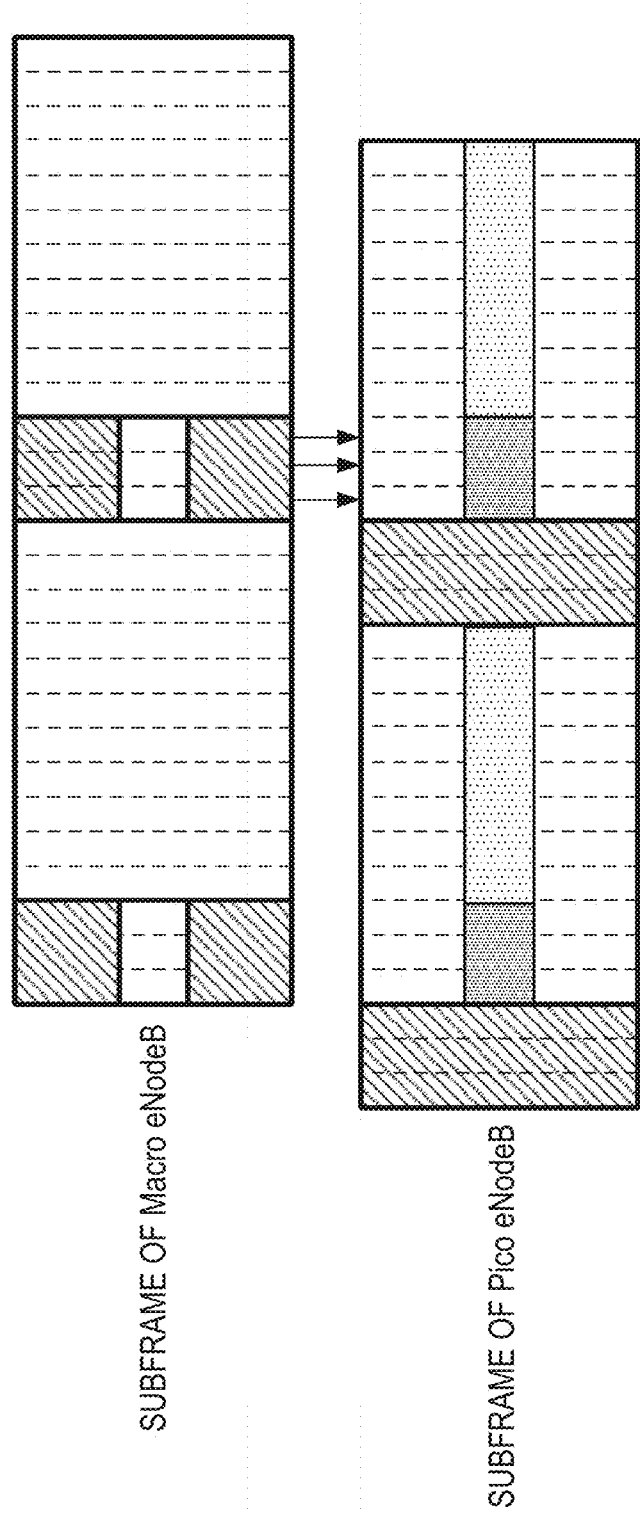
FIG. 6 is a diagram illustrating the manner in which UE Specific Search Space of the control area PDCCH on Macro eNodeB side is specified except for the center 72 subcarrier which is used by the control area PDCCH_MTC on Pico eNodeB side.

That is, as illustrated in FIG. 6, the UE Specific Search Space in the control area PDCCH on the Macro eNodeB side is designed to have no interference with the PDCCH_MTC of the Pico eNodeB by allocating the control information PDCCH on the downlink subframes in the current cell so as not to overlap with the center 72 sub carrier which is used by the control area PDCCH_MTC on the Pico eNodeB side.

In the example illustrated in FIG. 6, the control signal itself is allocated so as not to overlap with the center 72 sub carrier. Consequently, even with the center 72 sub carrier not excluded from the Search Space of the UE terminal side, no problem arises because Blind decoding of a CCE in the center 72 sub carrier portion causes a CRC error. Alternatively, the UE terminal may recognize that Search of the portion should not be made for the UE Specific Search Space, and performs no decoding operation. The latter is advantageous in that a load to the UE terminal is reduced.

The Macro eNodeB communicates with the Pico eNodeB through the X2 interface, S-GW, and MME to recognize the frequency band in which the virtual carrier is allocated. The Macro eNodeB then transmits the control information PDCCH without using the frequency band in which the control area PDCCH_MTC of the virtual carrier is allocated by the Pico eNodeB.

As a method of omitting Search or omitting decoding of the center 72 sub carrier portion performed by the UE terminal, the hash function, which determines the location of the UE Specific Search Space, may be configured to specify a position so as not to overlap with the center 72 sub carrier portion. As one of the method, a position may be specified after the center 72 sub carrier portion is initially excluded from the addresses to be specified by the hash function.

There is also another method such as specifying a position in an area on the left of the center 72 sub carrier portion by the hash function or setting an area on the right to be identical with the area on the left.

Method 2-2: proposed is a method of allocating the control area PDCCH_MTC of the virtual carrier so as not to overlap with the Common Search Space of PDCCH.

The method of limiting the range of Search Space according to Method 2-1 assumes the UE Specific Search Space as the SearchSpace. However, the Common Search Space is needed by the Macro eNodeB depending on a cell radius, and must be allocated contiguously from the head of a CCE. The Common Search Space is an area on which Search is made and Blind decoding is attempted to be performed by all the UE terminals, and thus it is not desirable to prohibit transmission of the area. When the Common Search Space is allocated so as not to overlap with the center 72 sub carrier as illustrated in FIG. 6, a problem arises if the Common Search Space reaches the center 72 sub carrier.

Figure 7:
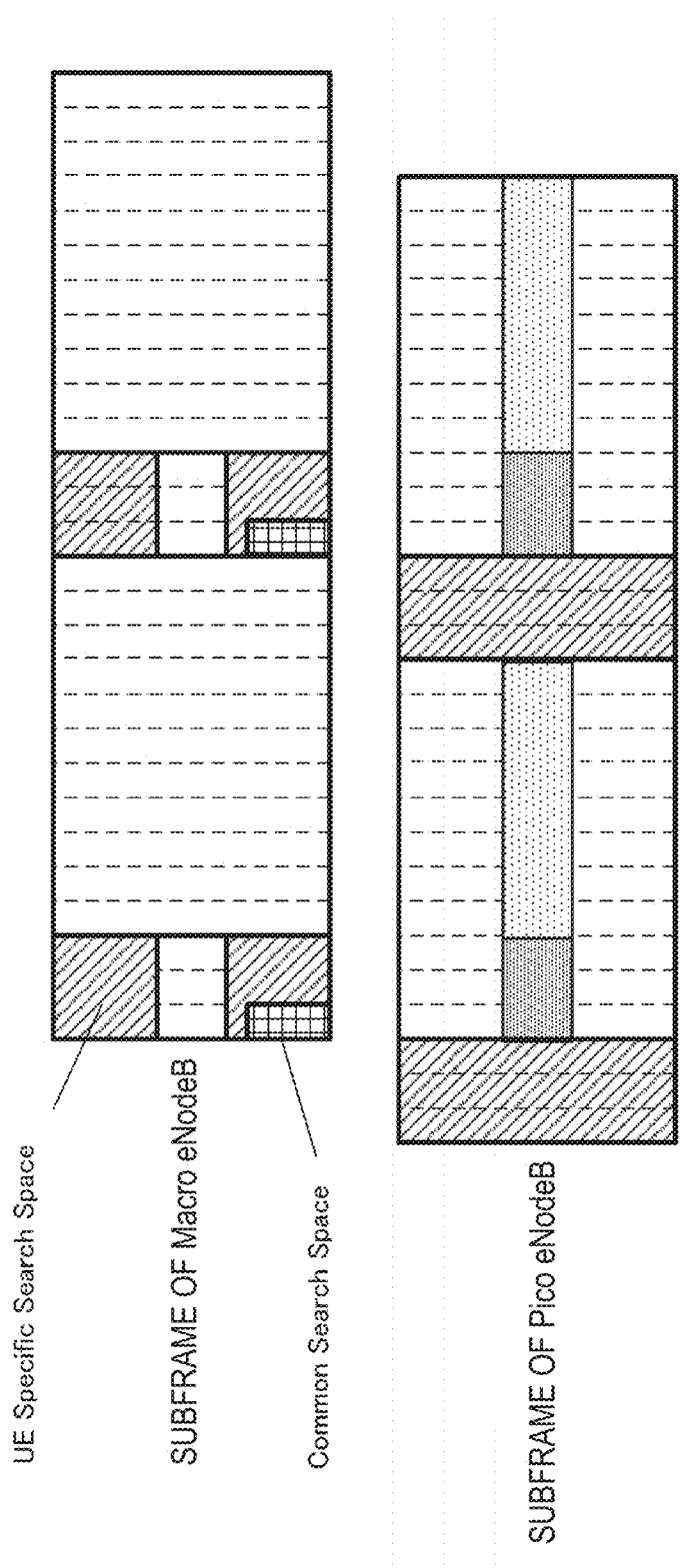
FIG. 7 is a diagram illustrating the manner in which the control area PDCCH_MTC of the virtual carrier is allocated so as not to overlap with Common Search Space of the PDCCH.

The area of the Common Search Space needs 576 sub carriers from the first OFDM symbol in increasing order of frequency (described above). Because the number of sub carriers is 1201 when the Macro eNodeB selects a bandwidth of 20 MHz (see Table 1), contiguously allocated Common Search Space from the head of the CCE does not reach the center 72 sub carrier as illustrated in FIG. 7, and thus the Common Search Space can be used by the method 2-1. However, when a bandwidth of 15 MHz or lower is selected, the Common Search Space cannot be contiguously allocated from the head of the CCE without overlapping with the center 72 sub carrier.

Figure 8:
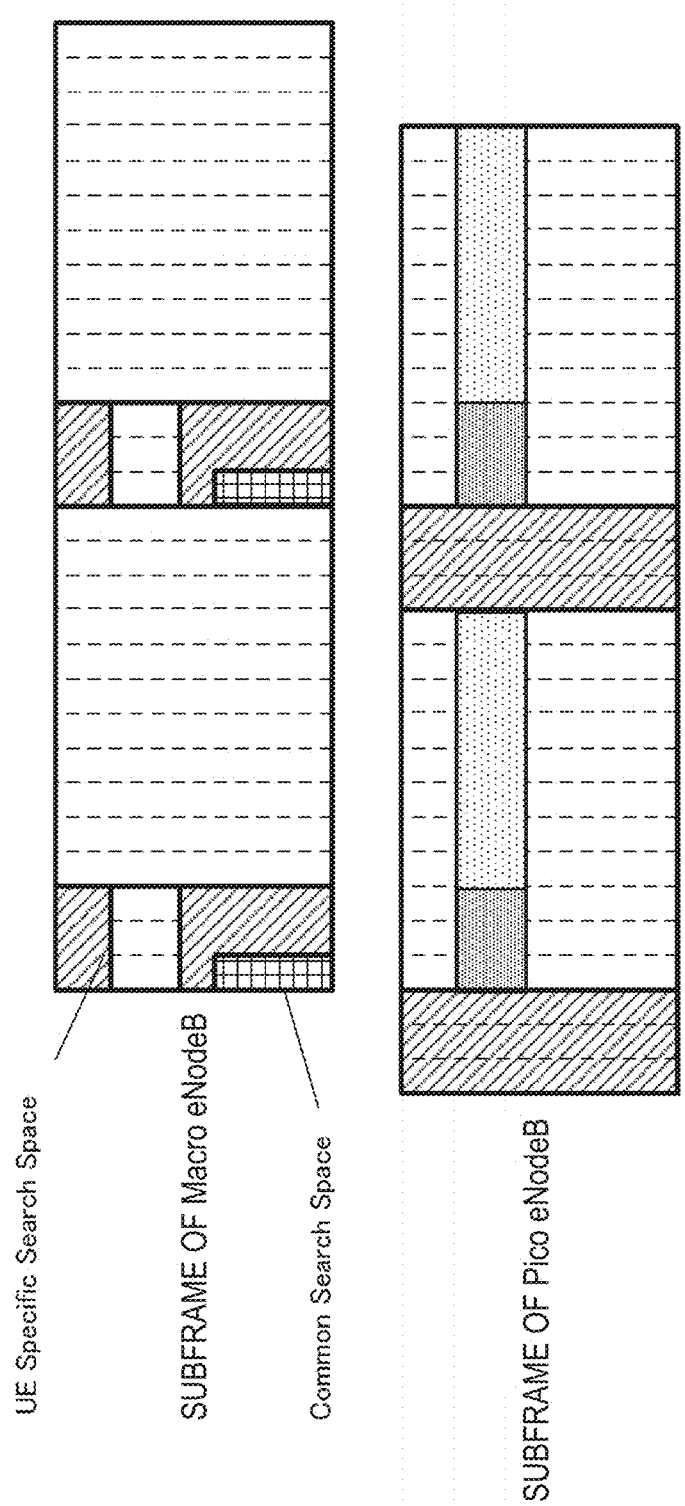
FIG. 8 is a diagram illustrating the manner in which the control area PDCCH_MTC of the virtual carrier is allocated so as not to overlap with the Common Search Space of the PDCCH.

Thus, as the method 2-2, the Pico eNodeB allocates the virtual carrier out of the range of the Common Search Space according to a bandwidth to be used as illustrated in FIG. 8. According to the method 2-1, the Macro eNodeB specifies the control area PDCCH (UE Specific Search Space) so as not to overlap with the sub carrier used by the control area PDCCH_MTC on the Pico eNodeB side, thereby preventing interference to the PDCCH_MTC of the Pico eNodeB.

The Pico eNodeB communicates with the Macro eNodeB through the X2 interface, S-GW, and MME to acquire the information of a band which carries the Common Search Space on the Macro eNodeB side. The Pico eNodeB then transmits the control area PDCCH_MTC of the virtual carrier, the control area PDCCH_MTC not overlapping with the band of the Common Search Space.

Figure 12:
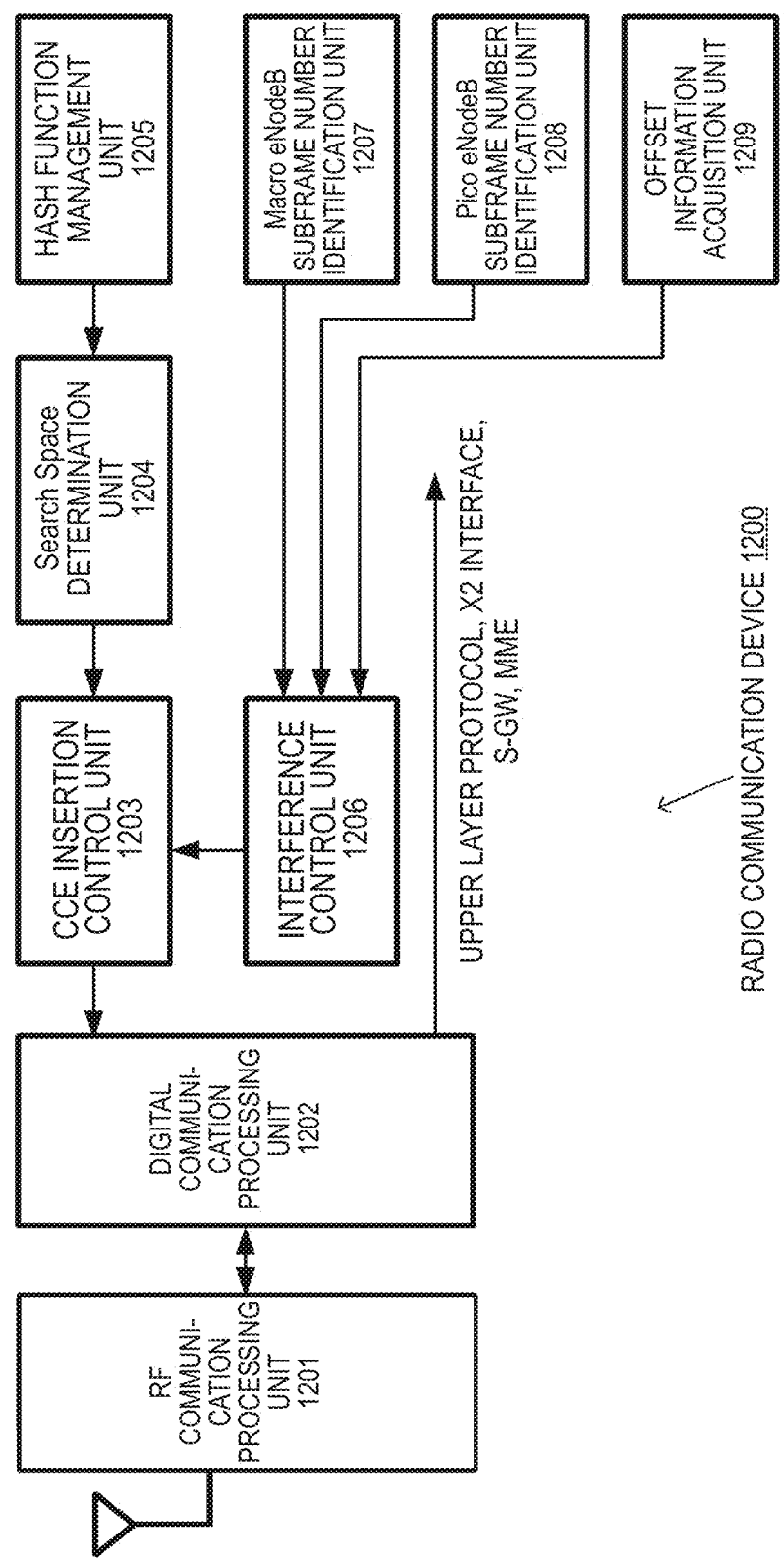
FIG. 12 is a diagram schematically illustrating a configuration example of radio communication device 1200 which serves as Macro eNodeB.

FIG. 12 schematically illustrates a configuration example of a radio communication device 1200 which serves as a Macro eNodeB that achieves the above-described methods 2-1, 2-2.

The radio communication device 1200 includes an RF communication processing unit 1201 to perform an analog processing on a radio signal which is transmitted/received via an antenna, and a digital communication processing unit 1202 to perform modulation processing on a digital transmission signal and demodulation processing on a digital reception signal. The digital communication processing unit 1202 exchanges transmission/reception data with an upper layer protocol of a communication layer of the radio communication device 1200. In addition, the digital communication processing unit 1202 communicates with another eNodeB through the X2 interface, S-GW, and MME.

A Macro eNodeB subframe number identification unit 1207 identifies the subframe number of a Macro eNodeB. A Pico eNodeB sub frame number identification unit 1208 identifies the subframe number of a Pico eNodeB. An offset information acquisition unit 1209 identifies an amount of deviation between the subframes of the Macro eNodeB and the Pico eNodeB in units of OFDM symbols. An interference control unit 1206 identifies the frequency band which includes the control area PDCCH_MTC of the virtual carrier transmitted by the Picoe NodeB.

A hash function management unit 1205 determines a hash function to be used in each subframe according to a position identified by the interference control unit 1206, the position causing interference to the PDCCH_MTC. A Search Space determination unit 1204 determines the location of the UE Specific Search Space of each UE terminal associated with the current cell using a hash function stored in the hash function management unit 1205 in consideration of an interference-causing subframe identified by the interference control unit 1206. Specifically, the Search Space determination unit specifies the UE Specific Search Space of the control area PDCCH on the Macro eNodeB side so as not to overlap with the band used by the control area PDCCH_MTC on the Pico eNodeB side, and specifies the UE Specific Search Space of the control area PDCCH on the Macro eNodeB side so as not to overlap with the center 72 sub carrier used by the control area PDCCH_MTC on the Pico eNodeB side. A CCE insertion control unit 1203 controls the insertion of each CCE to the PDCCH based on the determined Specific Search Space.

Figure 13:
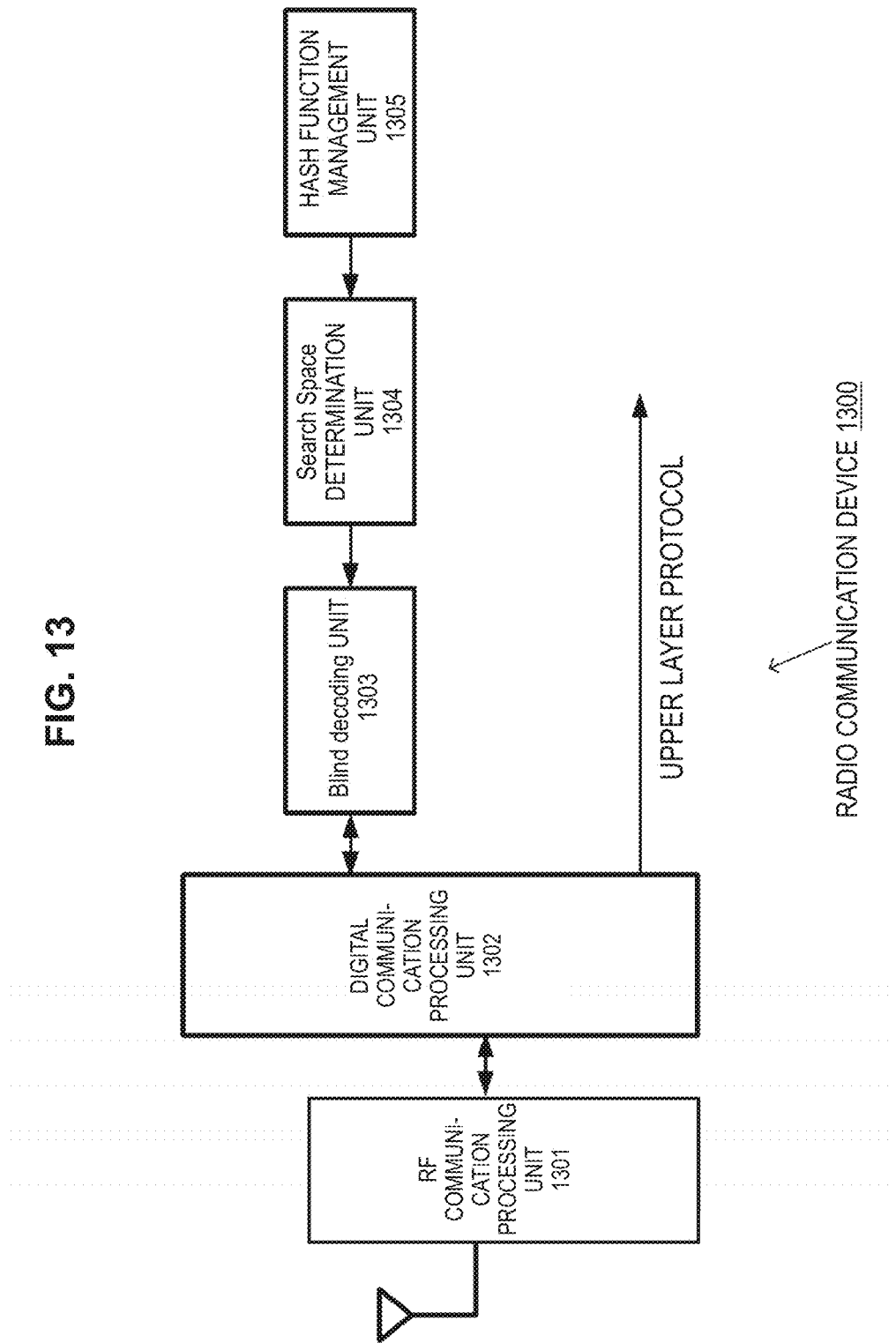
FIG. 13 is a diagram schematically illustrating a configuration example of radio communication device 1300 which serves as a UE terminal belonging to the Macro eNodeB illustrated in FIG. 12.
Figure 14:
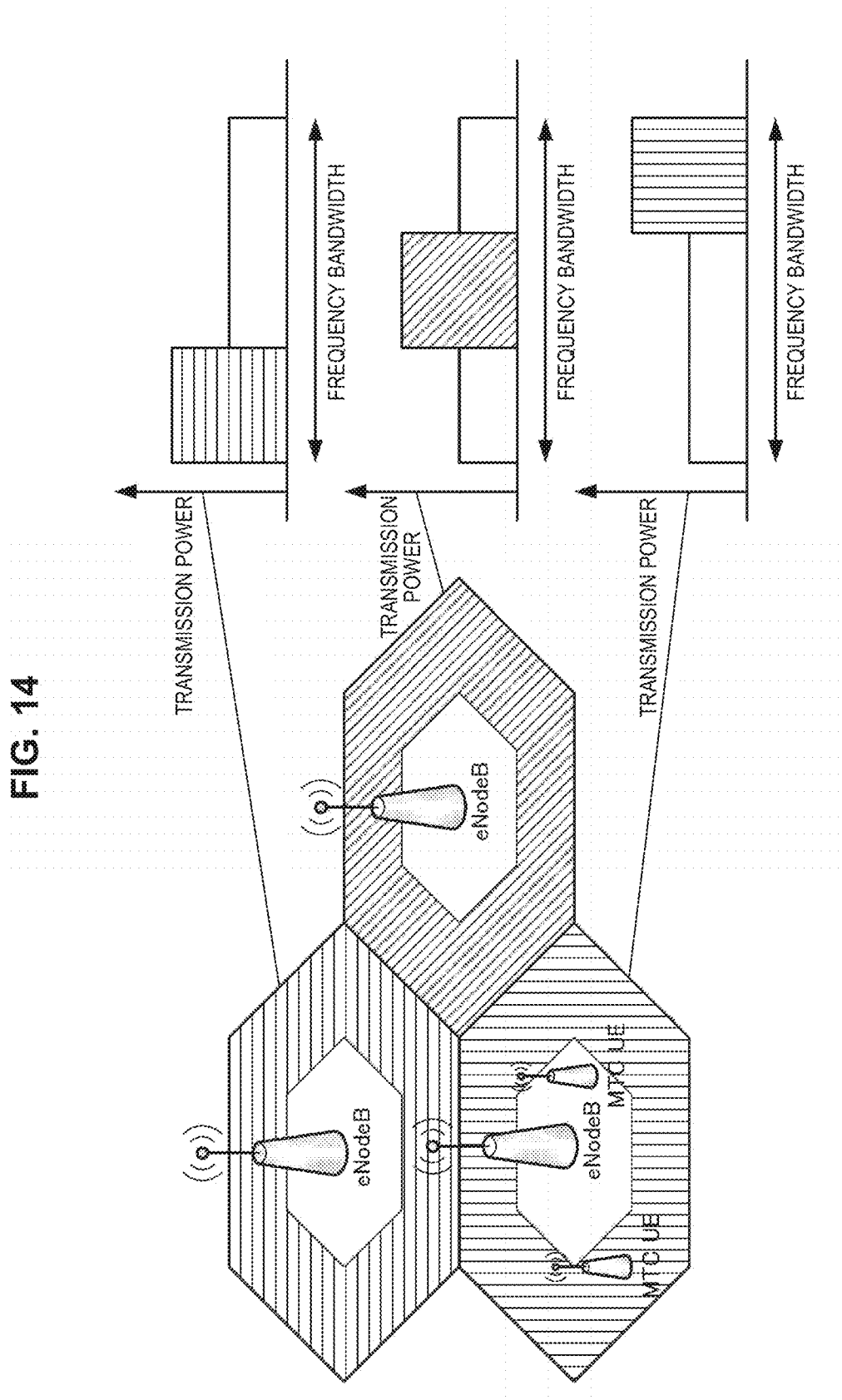
FIG. 14 is an illustration depicting the manner in which three cells 1 to 3, which perform fractional frequency reuse, are adjacent to each other.
Figure 15:
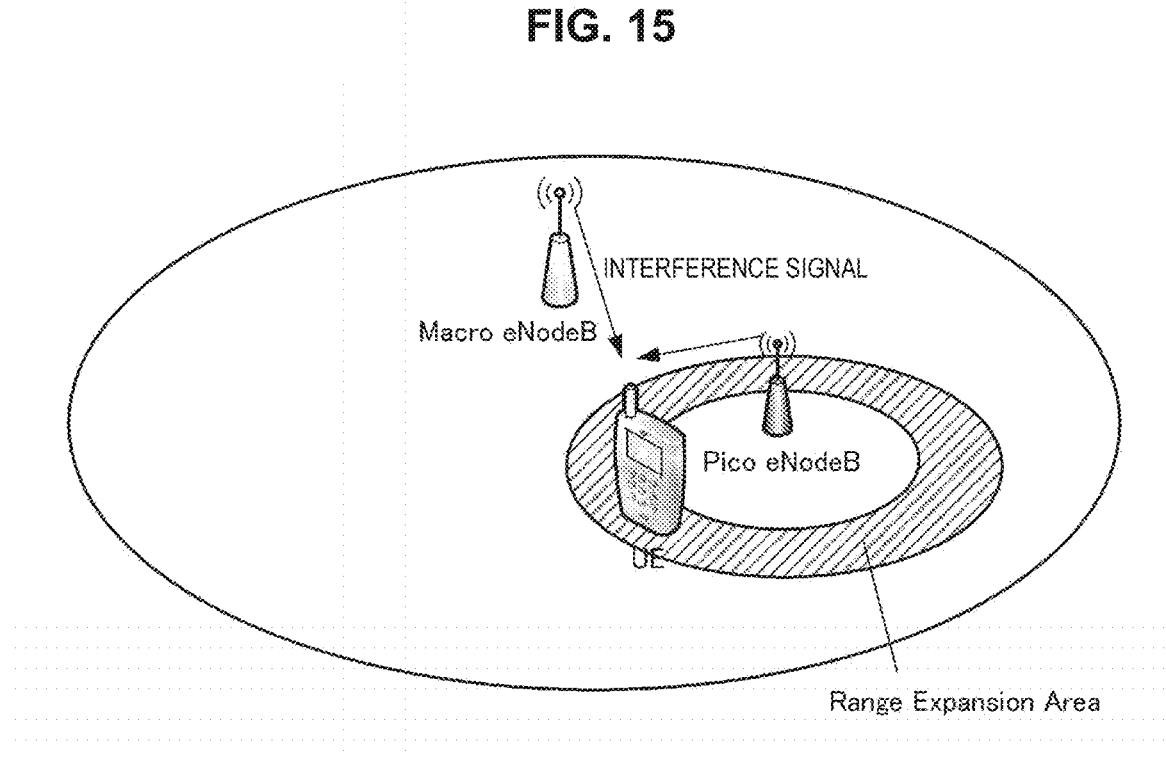
FIG. 15 is an illustration for explaining the Range Expansion which is defined in the 3GPP Rel 10.

FIG. 13 schematically illustrates a configuration example of radio communication device 1300 which serves as a UE terminal belonging to the Macro eNodeB illustrated in FIG. 12.

The radio communication device 1300 includes an RF communication processing unit 1301 to perform an analog processing on a radio signal which is transmitted/received via an antenna, and a digital communication processing unit 1302 to perform modulation processing on a digital transmission signal and demodulation processing on a digital reception signal. The digital communication processing unit 1302 exchanges transmission/reception data with an upper layer protocol of a communication layer of the radio communication device 1300.

A hash function management unit 1305 determines a hash function to be used in each subframe. A Search Space determination unit 1304 determines the location of the Search Space. In addition, the Search Space determination unit 1304 determines the location of the UE Specific Search Space of the current terminal using a hash function stored in the hash function management unit 1305. A Blind decoding unit 2003 performs Blind decoding on the PDCCH of the Macro eNodeB based on the determined UE Specific Search Space.

In order to perform a virtual carrier operation having a band restricted to a part of the donor band of 20 MHz, a UE terminal (MTC terminal), which is associated with an eNodeB that transmits a virtual carrier, needs a mechanism for recognizing the location of the virtual carrier. The operational procedure for an MTC terminal to be able to receive the virtual carrier from the eNodeB will be described below.

Step 1: the MTC terminal selects a corresponding eNodeB. The MTC terminal performs synchronous processing on the target eNodeB. The synchronous processing is performed using the (above-described) PSS, SSS which have been inserted in specific subframes. The MTC terminal receives a reference signal such as a Cell Specific Reference signal from the synchronized eNodeB, and acquires a value corresponding to a reference signal received power RSRP. Basically, an eNodeB having the highest RSRP is selected for connection. The MTC terminal, however, makes comparison between eNodeBs with an offset of 10 to 15 dB added to the RSRP of each Pico eNodeB, so that connection to a Pico eNodeB is likely to occur. The MTC terminal is manufactured so as to receive a signal in a narrow band only. Because the PSS, SSS of eNodeB are allocated at the center 72 sub carrier in the donor band of 20 MHz, acquisition of RSRP is suitably performed using a signal in the center 72 sub carrier.

Step 2: The MTC terminal acquires the position of the virtual carrier of the selected eNodeB. The MTC, after determining the eNodeB to be connected by the above-described step 1, needs to recognize which frequency position (sub carrier) is used for operating the virtual carrier in the eNodeB.

As a method, the system information transmitted by the eNodeB may be used. The information, which has been broadcast as the system information BCH from the eNodeB, includes the frequency position of the virtual carrier. The MTC terminal, while receiving the center 72 sub carrier of the donor band in step 1, acquires the system information to be able to recognize the frequency position of the virtual carrier.

As another method, the MTC terminal may perform scanning operation to identify the virtual carrier. However, the scanning operation increases the load to the MTC terminal, thereby conflicting with a feature of MTC, that is, extremely low power consumption (described above).

Step 3: The MTC terminal acquires the position information in time direction of the control area PDCCH_MTC of the virtual carrier.

As a method, the system information transmitted by the eNodeB may be used. The information, which has been broadcast as the system information BCH from the eNodeB, includes the frequency position of the virtual carrier. The MTC terminal, while receiving the center 72 sub carrier of the donor band in step 1, acquires the system information to be able to recognize the position of the virtual carrier in time direction.

As another method, the MTC terminal performs Blind decoding on the virtual carrier to obtain desired control information, thereby acquiring the location of the virtual carrier. The Blind decoding is used in general LTE as a method for acquiring the CCE addressed to the MTC terminal, in a normal PDCCH. In this method, the CCE, which indicates the head of the PDCCH_MTC, is designed to be received by all the terminals. Each MTC terminal performs Blind decoding on the virtual carrier to search for a location where CRC returns OK, and thus can recognize the location as the head of the PDCCH_MTC.

The MTC terminal determines an eNodeB to be connected according to the operational procedure of the above steps 1 to 3, obtains the position of the virtual carrier, and thus acquire the position of PDCCH_MTC in the virtual carrier. Consequently, the technology disclosed in the present description can be implemented.

Additionally, the technology disclosed herein may also be configured as below.

(1)
A radio communication device (Pico eNodeB or Macro eNodeB) including:
an information acquisition unit configured to acquire information of a frequency position (the center 72 sub carrier of the donor area) at which predetermined indispensable information BCH, PSS, SSS is allocated in a data area PDSCH of a downlink subframe transmitted by an adjacent base station Macro eNodeB or Pico eNodeB; and
a virtual carrier transmission control unit configured to transmit a virtual carrier (PDCCH_MTC, PDSCH_MTC) in a data area PDSCH of a downlink subframe of a current cell in a manner that the virtual carrier does not overlap with the frequency position at which the predetermined indispensable information BCH, PSS, SSS is allocated, the virtual carrier having a narrower band than a donor band.

(2)
The radio communication device according to (1),
wherein the subframes are synchronized between the radio communication device and the adjacent base station Macro eNodeB or Pico eNodeB.

(3)
The radio communication device according to (1),
wherein the subframes are not synchronized between the radio communication device and the adjacent base station Macro eNodeB or Pico eNodeB.

(4)
A radio communication device (Pico eNodeB or Macro eNodeB) including:
an information acquisition unit configured to acquire information of a location at which predetermined indispensable information BCH, PSS, SSS is allocated in a data area PDSCH of a downlink subframe transmitted by an adjacent base station Macro eNodeB or Pico eNodeB; and
a virtual carrier operation unit configured to prohibit operation of a virtual carrier (PDCCH_MTC, PDSCH_MTC) in a data area PDSCH of a downlink subframe of a current cell, the downlink subframe overlapping with the subframe in which the predetermined indispensable information BCH, PSS, SSS is allocated, the virtual carrier having a narrower band than a donor band.

(5)
The radio communication device according to (4),
wherein the subframes are synchronized between the radio communication device and the adjacent base station Macro eNodeB or Pico eNodeB.

(6)
The radio communication device according to (4),
wherein the subframes are not synchronized between the radio communication device and the adjacent base station Macro eNodeB or Pico eNodeB.

(7)
A radio communication device (Pico eNodeB or Macro eNodeB) including:
an information acquisition unit configured to acquire information of a location at which predetermined indispensable information BCH, PSS, SSS is allocated in a data area PDSCH of a downlink subframe transmitted by an adjacent base station Macro eNodeB or Pico eNodeB; and
a virtual carrier operation unit configured to prohibit transmission of control information PDCCH_MTC of a virtual carrier in a data area PDSCH of a downlink subframe of a current cell, the downlink subframe overlapping with the subframe in which the predetermined indispensable information BCH, PSS, SSS is allocated, the virtual carrier having a narrower band than a donor band.

(8)
The radio communication device according to (7),
wherein the subframes are synchronized between the radio communication device and the adjacent base station Macro eNodeB or Pico eNodeB.

(9)
A radio communication device including:
an information acquisition unit configured to acquire information of a frequency band in which a control area PDCCH_MTC of a virtual carrier is allocated in a data area PDSCH of a downlink subframe by an adjacent base station Pico eNodeB, the virtual carrier having a narrower band than a donor band; and
a subframe transmission control unit configured to transmit control information of a downlink subframe of a current cell without overlapping with the frequency band in which the control area PDCCH_MTC of the virtual carrier is allocated by the adjacent base station Pico eNodeB.

(10)
The radio communication device according to (9),
wherein the subframes are not synchronized between the radio communication device and the adjacent base station Macro eNodeB or Pico eNodeB.

(11)
A radio communication device (Pico eNodeB) including:
an information acquisition unit configured to acquire information of a band included in a downlink subframe transmitted by an adjacent base station Macro eNodeB, the information of the band carrying control information Common Search Space for all terminals in the adjacent cell; and
a virtual carrier transmission control unit configured to transmit a control area PDCCH_MTC of a virtual carrier in a data area PDSCH of a downlink subframe of a current cell in a manner that the control area does not overlap with a band for transmitting the control information Common Search Space by the adjacent base station Macro eNodeB, the virtual carrier having a narrower band than a donor band.

(12)
The radio communication device according to (11),
wherein the subframes are not synchronized between the radio communication device and the adjacent base station Macro eNodeB or Pico eNodeB.

(13)
A radio communication method including:
a step of acquiring information of a frequency position (the center 72 sub carrier of the donor area) at which predetermined indispensable information BCH, PSS, SSS is allocated in a data area PDSCH of a downlink subframe transmitted by an adjacent base station Macro eNodeB or Pico eNodeB; and
a step of transmitting a virtual carrier (PDCCH_MTC, PDSCH_MTC) in a data area PDSCH of a downlink subframe of a current cell in a manner that the virtual carrier does not overlap with the frequency position at which the predetermined indispensable information BCH, PSS, SSS is allocated, the virtual carrier having a narrower band than a donor band.

(14)
A radio communication method including:
a step of acquiring information of a location at which predetermined indispensable information BCH, PSS, SSS is allocated in a data area PDSCH of a downlink subframe transmitted by an adjacent base station Macro eNodeB or Pico eNodeB; and
a virtual carrier operation step of prohibiting operation of a virtual carrier (PDCCH_MTC, PDSCH_MTC) in a data area PDSCH of a downlink subframe of a current cell, the downlink subframe overlapping with the subframe in which the predetermined indispensable information BCH, PSS, SSS is allocated, the virtual carrier having a narrower band than a donor band.

(15)

A radio communication method including:

a step of acquiring information of a location at which predetermined indispensable information BCH, PSS, SSS is allocated in a data area PDSCH of a downlink subframe transmitted by an adjacent base station Macro eNodeB or Pico eNodeB; and a virtual carrier operation step of prohibiting transmission of PDCCH_MTC of a virtual carrier in a data area PDSCH of a downlink subframe of a current cell, the downlink subframe overlapping with the subframe in which the predetermined indispensable information BCH, PSS, SSS is allocated, the virtual carrier having a narrower band than a donor band.

(16)

A radio communication method including:

a step of acquiring information of a frequency band in which a control area PDCCH_MTC of a virtual carrier is allocated in a data area PDSCH of a downlink subframe by an adjacent base station Pico eNodeB, the virtual carrier having a narrower band than a donor band; and a step of transmitting control information of a downlink subframe of a current cell without overlapping with the frequency band in which the control area PDCCH_MTC of the virtual carrier is allocated by the adjacent base station Pico eNodeB.

(17)

A radio communication method including:

a step of acquiring information of a band included in a downlink subframe transmitted by an adjacent base station Macro eNodeB, the information of the band carrying control information Common Search Space for all terminals in the adjacent cell; and a step of transmitting a control area of a virtual carrier in a data area PDSCH of a downlink subframe of a current cell in a manner that the control area PDCCH_MTC does not overlap with a band for transmitting the control information Common Search Space by the adjacent base station Macro eNodeB, the virtual carrier having a narrower band than a donor band.

(18)

A radio communication system including:

a first base station Macro eNodeB configured to allocate predetermined indispensable information BCH, PSS, SSS at a predetermined frequency position (the center 72 sub carrier of the donor area) of a data area PDSCH of a downlink subframe at a predetermined position of a current cell; and a second base station Pico eNodeB configured to transmit a virtual carrier (PDCCH_MTC, PDSCH_MTC) in the data area PDSCH of the downlink subframe of the current cell in a manner that the virtual carrier does not overlap with the frequency position at which the predetermined indispensable information BCH, PSS, SSS is allocated, the virtual carrier having a narrower band than a donor band.

(19)

A radio communication system including:

a first base station Macro eNodeB configured to allocate predetermined indispensable information BCH, PSS, SSS in a data area PDSCH of a downlink subframe at a predetermined position of a current cell; and a second base station configured to prohibit operation of a virtual carrier (PDCCH_MTC, PDSCH_MTC) in a data area PDSCH of a downlink subframe of a current cell, the downlink subframe overlapping with the subframe in which the predetermined indispensable information BCH, PSS, SSS is allocated, the virtual carrier having a narrower band than a donor band.

(20)

A radio communication system including:

a first base station Macro eNodeB configured to allocate predetermined indispensable information BCH, PSS, SSS in a data area PDSCH of a downlink subframe at a predetermined position of a current cell; and a second base station configured to prohibit transmission of PDCCH_MTC of a virtual carrier (PDCCH_MTC, PDSCH_MTC) in a data area PDSCH of a downlink subframe of a current cell, the downlink subframe overlapping with the subframe in which the predetermined indispensable information BCH, PSS, SSS is allocated, the virtual carrier having a narrower band than a donor band.

(21)

A radio communication system including:

a first base station Pico eNodeB configured to transmit a virtual carrier at a predetermined frequency band of a data area PDSCH of a downlink subframe of a current cell, the virtual carrier having a narrower band than a donor band; and a second base station Macro eNodeB configured to transmit control information of the downlink subframe of the current cell without overlapping with the frequency band in which the control area PDCCH_MTC of the virtual carrier is allocated by the first base station.

(22)

A radio communication system including:

a first base station Macro eNodeB configured to transmit a subframe which includes control information Common Search Space for all terminals in a current cell; and a second base station Pico eNodeB configured to transmit a control area PDCCH_MTC of a virtual carrier in a data area PDSCH of a downlink subframe of the current cell in a manner that the control area does not overlap with a band for transmitting the control information Common Search Space by the first base station Macro eNodeB, the virtual carrier having a narrower band than a donor band.

INDUSTRIAL APPLICABILITY

It should be understood by those skilled in the art that various modifications, combinations, sub-combinations and alterations may occur depending on design requirements and other factors insofar as they are within the scope of the appended claims or the equivalents thereof.

In the present description, the embodiment, which is applied to a cellular communications system in accordance with the LTE defined by the 3GPP, has been mainly described. However, the gist of the technology disclosed in the present description is not limited to this. The technology disclosed in the present description can be similarly applied to various cellular communications systems in which cells with different sizes are hierarchically structured.

In short, the present technology disclosed by the present specification has been explained in a form of illustration and should not be interpreted limitedly. To determine the gist of the present technology disclosed in the present specification, patent claims should be taken into account.

REFERENCE SIGNS LIST 900 radio communication device
901 RF communication processing unit 902 digital communication processing unit
903 virtual carrier control unit
904 virtual carrier subframe position determination unit
905 Macro eNodeB subframe number identification unit
906 Pico eNodeB subframe number identification unit
1000 radio communication device
1001 RF communication processing unit
1002 digital communication processing unit
1003 virtual carrier subframe position holding unit
1200 radio communication device
1201 RF communication processing unit
1202 digital communication processing unit
1203 CCE insertion control unit
1204 Search Space determination unit
1205 hash function management unit
1206 interference control unit
1207 Macro eNodeB subframe number identification unit
1208 Pico eNodeB subframe number identification unit
1209 offset information acquisition unit
1300 radio communication device
1301 RF communication processing unit
1302 digital communication processing unit
1303 Blind decoding unit
1304 Search Space determination unit
1305 hash function management unit

The invention claimed is:

1. A radio communication device comprising:
a processing device configured to:
acquire information from an adjacent base station of a frequency position in a donor band at which predetermined indispensable information of the adjacent base station is allocated in a data area of a downlink subframe transmitted by the adjacent base station; and
transmit a narrow band carrier in a data area of a downlink subframe of a current cell in a manner that the narrow band carrier is at a frequency position in the donor band that does not overlap in frequency with the frequency position in the donor band at which the predetermined indispensable information of the adjacent base station is allocated, the narrow band carrier having a narrower band than the donor band.

2. The radio communication device according to claim 1, wherein the subframes are synchronized between the radio communication device and the adjacent base station.

3. The radio communication device according to claim 1, wherein the subframes are not synchronized between the radio communication device and the adjacent base station.

4. A radio communication device comprising:
a processing device configured to:
acquire information from an adjacent base station of a frequency band in a donor band in which a control area of a narrow band carrier is allocated in a data area of a downlink subframe by the adjacent base station, the narrow band carrier having a narrower band than the donor band; and
transmit, in the donor band, control information of a downlink subframe of a current cell without overlapping in frequency with a center sub carrier in the donor band in which the control area of the narrow band carrier is allocated by the adjacent base station.

5. The radio communication device according to claim 4, wherein the subframes are not synchronized between the radio communication device and the adjacent base station.

6. A radio communication device comprising:
a processing device configured to:
acquire information from an adjacent base station of a band in a donor band included in a downlink subframe transmitted by the adjacent base station, the information of the band carrying control information for all terminals in an adjacent cell; and
transmit a control area of a narrow band carrier in a data area of a downlink subframe of a current cell in a manner that the control area is at a frequency position in the donor band that does not overlap in frequency with the band in the donor band for transmitting the control information by the adjacent base station, the narrow band carrier having a narrower band than the donor band.

7. The radio communication device according to claim 6, wherein the subframes are not synchronized between the radio communication device and the adjacent base station.

8. A radio communication method comprising:
acquiring information from an adjacent base station of a frequency position in a donor band at which predetermined indispensable information of the adjacent base station is allocated in a data area of a downlink subframe transmitted by an adjacent base station; and
transmitting a narrow band carrier in a data area of a downlink subframe of a current cell in a manner that the narrow band carrier is at a frequency position in the donor band that does not overlap in frequency with the frequency position in the donor band at which the predetermined indispensable information of the adjacent base station is allocated, the narrow band carrier having a narrower band than the donor band.

9. A radio communication method comprising:
acquiring information from an adjacent base station of a frequency band in a donor band in which a control area of a narrow band carrier is allocated in a data area of a downlink subframe by the adjacent base station, the narrow band carrier having a narrower band than the donor band; and
transmitting, in the donor band, control information of a downlink subframe of a current cell without overlapping in frequency with a center sub carrier in the donor band in which a control area of the narrow band carrier is allocated by the adjacent base station.

10. A radio communication method comprising:
acquiring information from an adjacent base station of a band in a donor band included in a downlink subframe transmitted by the adjacent base station, the information of the band carrying control information for all terminals in an adjacent cell; and
transmitting a control area of a narrow band carrier in a data area of a downlink subframe of a current cell in a manner that the control area is at a frequency position in the donor band that does not overlap in frequency with the band in the donor band for transmitting the control information by the adjacent base station, the narrow band carrier having a narrower band than the donor band.

11. A radio communication system comprising:
a first base station configured to allocate predetermined indispensable information of the first base station at a frequency position in a donor band of a data area of a downlink subframe at a predetermined position of a current cell; and
a second base station configured to transmit, based on information of the frequency position in the donor band acquired from the first base station, a narrow band carrier in the data area of the downlink subframe of the current cell in a manner that the narrow band carrier is at a frequency position in the donor band that does not overlap in frequency with the frequency position in the donor band at which the predetermined indispensable information of the first base station is allocated, the narrow band carrier having a narrower band than the donor band.

12. A radio communication system comprising:
a first base station configured to transmit a narrow band carrier at a frequency band in a donor band of a data area of a downlink subframe of a current cell, the narrow band carrier having a narrower band than the donor band; and
a second base station configured to transmit in the donor band, based on information of the frequency band in the donor band acquired from the first base station, control information of the downlink subframe of the current cell without overlapping in frequency with a center sub carrier in the donor band in which the control area of the narrow band carrier is allocated by the first base station.

13. A radio communication system comprising:
a first base station configured to transmit a subframe which includes control information for all terminals in a current cell; and
a second base station configured to transmit, based on information of a band in a donor band for transmitting control information acquired from the first base station, a control area of a narrow band carrier in a data area of a downlink subframe of the current cell in a manner that the control area is at a frequency position in the donor band that does not overlap in frequency with the band in the donor band for transmitting the control information by the first base station, the narrow band carrier having a narrower band than the donor band.

* * * * *